US012800792B2

(12) United States Patent
Latawiec et al.

(10) Patent No.: US 12,800,792 B2
(45) Date of Patent: Nov. 17, 2026

(54) POLARIZATION-TUNED METASURFACE DEVICE

(71) Applicant: Metalenz, Inc., Boston, MA (US)

(72) Inventors: Pawel Latawiec, Chicago, IL (US); Mohammad Salary, San Francisco, CA (US)

(73) Assignee: Metalenz, Inc., Boston, MA (US)

(*) Notice: Subject to any disclaimer, the term of this patent is extended or adjusted under 35 U.S.C. 154(b) by 309 days.

(21) Appl. No.: 18/592,246

(22) Filed: Feb. 29, 2024

(65) Prior Publication Data

US 2024/0295672 A1 Sep. 5, 2024

Related U.S. Application Data

(60) Provisional application No. 63/487,766, filed on Mar. 1, 2023.

(51) Int. Cl.
*G02B 1/00* (2006.01)
*G02B 27/28* (2006.01)

(52) U.S. Cl.
CPC ........... *G02B 1/002* (2013.01); *G02B 27/285* (2013.01)

(58) Field of Classification Search
CPC .. G02B 1/002; G02B 27/285; G02B 19/0057; G02B 27/1086; G02B 27/283;
(Continued)

(56) References Cited

U.S. PATENT DOCUMENTS

| | | | |
|---|---|---|---|
| 3,877,034 | A | 4/1975 | Nelson |
| 4,777,116 | A | 10/1988 | Kawatsuki et al. |

(Continued)

FOREIGN PATENT DOCUMENTS

| | | | |
|---|---|---|---|
| CA | 3006173 | A1 | 6/2017 |
| CA | 3020261 | A1 | 10/2017 |

(Continued)

OTHER PUBLICATIONS

Extended European Search Report for European Application No. 16869282.0, Search completed Nov. 8, 2019, Mailed Nov. 20, 2019, 15 pgs.

(Continued)

*Primary Examiner* — Henry Duong
(74) *Attorney, Agent, or Firm* — KPPB LLP

(57) ABSTRACT

A metasurface device may include a metasurface including multiple metasurface elements configured to receive light including at least one of a first polarization or a second polarization with a diverging wavefront from a light source. The first polarization and the second polarization may be orthogonal. The metasurface elements may include an interior metasurface element which is substantially aligned to an axis and exterior metasurface elements which are rotated with respect to the axis. The exterior metasurface elements positioned farther away from the interior metasurface element may be more rotated than the exterior metasurface elements positioned closer to the interior metasurface element. The metasurface may be configured to diffract light with the first polarization into a first output light beam and/or light with the second polarization into a second output light beam.

43 Claims, 12 Drawing Sheets

(58) Field of Classification Search
CPC .......... G02B 5/18; G02B 27/01; G02B 26/10; G02B 1/02; F21V 9/14
USPC .................................................... 359/485.01
See application file for complete search history.

(56) References Cited

U.S. PATENT DOCUMENTS

| | | | |
|---|---|---|---|
| 4,856,899 | A | 8/1989 | Iwaoka et al. |
| 5,085,496 | A | 2/1992 | Yoshida et al. |
| 5,245,466 | A | 9/1993 | Burns et al. |
| 5,337,146 | A | 8/1994 | Azzam |
| 5,452,126 | A | 9/1995 | Johnson |
| 5,620,792 | A | 4/1997 | Challener |
| 6,097,856 | A | 8/2000 | Hammond |
| 6,643,065 | B1 | 11/2003 | Silberman |
| 6,669,803 | B1 | 12/2003 | Kathman et al. |
| 6,731,839 | B2 | 5/2004 | Bhagavatula et al. |
| 6,825,986 | B2 | 11/2004 | Ashkinazy et al. |
| 6,834,027 | B1 | 12/2004 | Sakaguchi et al. |
| 6,924,457 | B2 | 8/2005 | Koyama et al. |
| 6,927,922 | B2 | 8/2005 | George et al. |
| 6,958,207 | B1 | 10/2005 | Khusnatdinov et al. |
| 7,057,151 | B2 | 6/2006 | Lezec et al. |
| 7,061,612 | B2 | 6/2006 | Johnston |
| 7,061,693 | B2 | 6/2006 | Zalevsky |
| 7,171,078 | B2 | 1/2007 | Sasaki et al. |
| 7,171,084 | B2 | 1/2007 | Izumi et al. |
| 7,186,969 | B2 | 3/2007 | Altendorf et al. |
| 7,241,988 | B2 | 7/2007 | Gruber et al. |
| 7,324,210 | B2 | 1/2008 | De et al. |
| 7,327,468 | B2 | 2/2008 | Maznev et al. |
| 7,402,131 | B2 | 7/2008 | Mueth et al. |
| 7,450,618 | B2 | 11/2008 | Dantus et al. |
| 7,547,874 | B2 | 6/2009 | Liang |
| 7,561,264 | B2 | 7/2009 | Treado et al. |
| 7,576,899 | B2 | 8/2009 | Kanesaka et al. |
| 7,679,830 | B2 | 3/2010 | Dowski |
| 7,684,097 | B2 | 3/2010 | Fukumoto et al. |
| 7,773,307 | B2 | 8/2010 | Shih |
| 7,800,683 | B2 | 9/2010 | Zalevsky et al. |
| 7,812,295 | B2 | 10/2010 | Zalevsky et al. |
| 7,928,900 | B2 | 4/2011 | Fuller et al. |
| 7,929,220 | B2 | 4/2011 | Sayag |
| 7,965,607 | B2 | 6/2011 | Fukumoto et al. |
| 8,009,358 | B2 | 8/2011 | Zalevsky et al. |
| 8,040,604 | B2 | 10/2011 | Zalevsky et al. |
| 8,107,705 | B2 | 1/2012 | Dowski et al. |
| 8,152,307 | B2 | 4/2012 | Duelli et al. |
| 8,169,703 | B1 | 5/2012 | Mossberg et al. |
| 8,192,022 | B2 | 6/2012 | Zalevsky |
| 8,212,866 | B2 | 7/2012 | Lemmer et al. |
| 8,318,386 | B2 | 11/2012 | Kobrin |
| 8,328,396 | B2 | 12/2012 | Capasso et al. |
| 8,351,048 | B2 | 1/2013 | Millerd |
| 8,351,120 | B2 | 1/2013 | Deng et al. |
| 8,390,932 | B2 | 3/2013 | Jia et al. |
| 8,400,494 | B2 | 3/2013 | Zalevsky et al. |
| 8,430,513 | B2 | 4/2013 | Chang et al. |
| 8,451,368 | B2 | 5/2013 | Sung et al. |
| 8,472,797 | B2 | 6/2013 | Ok et al. |
| 8,481,948 | B2 | 7/2013 | Frach et al. |
| 8,558,873 | B2 | 10/2013 | Mceldowney |
| 8,587,474 | B2 | 11/2013 | Fuller et al. |
| 8,649,631 | B2 | 2/2014 | Islam et al. |
| 8,681,428 | B1 | 3/2014 | Brown |
| 8,687,040 | B2 | 4/2014 | Silveira |
| 8,716,677 | B2 | 5/2014 | Cui |
| 8,734,033 | B2 | 5/2014 | Walters et al. |
| 8,743,923 | B2 | 6/2014 | Geske et al. |
| 8,816,460 | B2 | 8/2014 | Kalevo et al. |
| 8,848,273 | B2 | 9/2014 | Yu et al. |
| 8,876,289 | B2 | 11/2014 | Dorronsoro Diaz et al. |
| 8,908,149 | B2 | 12/2014 | Freimann |
| 8,912,973 | B2 | 12/2014 | Werner et al. |
| 8,981,337 | B1 | 3/2015 | Burckel et al. |
| 9,007,451 | B2 | 4/2015 | Rogers et al. |
| 9,116,302 | B2 | 8/2015 | Mccarthy et al. |
| 9,151,891 | B2 | 10/2015 | Ma et al. |
| 9,212,899 | B2 | 12/2015 | Johnson et al. |
| 9,298,060 | B2 | 3/2016 | Shen et al. |
| 9,309,274 | B2 | 4/2016 | Van Der Boom et al. |
| 9,310,535 | B1 | 4/2016 | Greiner et al. |
| 9,329,484 | B1 | 5/2016 | Markle et al. |
| 9,330,704 | B2 | 5/2016 | Nishimura et al. |
| 9,367,036 | B2 | 6/2016 | Pyun et al. |
| 9,369,621 | B2 | 6/2016 | Malone et al. |
| 9,391,700 | B1 | 7/2016 | Bruce et al. |
| 9,392,153 | B2 | 7/2016 | Myhre et al. |
| 9,411,103 | B2 | 8/2016 | Astratov |
| 9,482,796 | B2 | 11/2016 | Arbabi et al. |
| 9,500,771 | B2 | 11/2016 | Liu et al. |
| 9,536,362 | B2 | 1/2017 | Sarwar et al. |
| 9,553,423 | B2 | 1/2017 | Chen et al. |
| 9,557,585 | B1 | 1/2017 | Yap et al. |
| 9,606,415 | B2 | 3/2017 | Zheludev et al. |
| 9,609,190 | B2 | 3/2017 | Lee et al. |
| 9,704,250 | B1 | 7/2017 | Shah et al. |
| 9,739,918 | B2 | 8/2017 | Arbabi et al. |
| 9,766,463 | B2 | 9/2017 | Border et al. |
| 9,778,404 | B2 | 10/2017 | Divliansky et al. |
| 9,825,074 | B2 | 11/2017 | Tian et al. |
| 9,829,700 | B2 | 11/2017 | Parent et al. |
| 9,835,870 | B2 | 12/2017 | Astratov et al. |
| 9,836,122 | B2 | 12/2017 | Border |
| 9,869,580 | B2 | 1/2018 | Grossinger et al. |
| 9,880,377 | B1 | 1/2018 | Safrani et al. |
| 9,885,859 | B2 | 2/2018 | Harris |
| 9,891,393 | B2 | 2/2018 | Reece |
| 9,939,129 | B2 | 4/2018 | Byrnes et al. |
| 9,947,118 | B2 | 4/2018 | Khare et al. |
| 9,952,096 | B2 | 4/2018 | Kats et al. |
| 9,958,251 | B1 | 5/2018 | Brock et al. |
| 9,967,541 | B2 | 5/2018 | Piestun |
| 9,978,801 | B2 | 5/2018 | Park et al. |
| 9,989,680 | B2 | 6/2018 | Arbabi et al. |
| 9,992,474 | B2 | 6/2018 | Grunnet-jepsen et al. |
| 9,995,859 | B2 | 6/2018 | Kamali et al. |
| 9,995,930 | B2 | 6/2018 | Arbabi et al. |
| 10,007,118 | B2 | 6/2018 | Border |
| 10,054,859 | B2 | 8/2018 | Ye et al. |
| 10,084,239 | B2 | 9/2018 | Shaver et al. |
| 10,108,085 | B2 | 10/2018 | Peters et al. |
| 10,126,466 | B2 | 11/2018 | Lin et al. |
| 10,132,465 | B2 | 11/2018 | Byrnes et al. |
| 10,149,612 | B2 | 12/2018 | Muyo et al. |
| 10,155,846 | B2 | 12/2018 | Fuji et al. |
| 10,234,383 | B2 | 3/2019 | Wang et al. |
| 10,254,454 | B2 | 4/2019 | Klug et al. |
| 10,267,957 | B2 | 4/2019 | Kamali et al. |
| 10,310,148 | B2 | 6/2019 | Stewart et al. |
| 10,310,387 | B2 | 6/2019 | Palmer et al. |
| 10,315,951 | B2 | 6/2019 | Toussaint et al. |
| 10,317,667 | B2 | 6/2019 | Waller et al. |
| 10,324,314 | B2 | 6/2019 | Czaplewski et al. |
| 10,338,275 | B1 | 7/2019 | Acosta et al. |
| 10,341,640 | B2 | 7/2019 | Shechtman et al. |
| 10,345,246 | B2 | 7/2019 | Tian et al. |
| 10,345,519 | B1 | 7/2019 | Miller et al. |
| 10,365,416 | B2 | 7/2019 | Zhan et al. |
| 10,371,936 | B2 | 8/2019 | Didomenico |
| 10,386,620 | B2 | 8/2019 | Astratov et al. |
| 10,388,805 | B2 | 8/2019 | Engel et al. |
| 10,402,993 | B2 | 9/2019 | Han et al. |
| 10,408,416 | B2 | 9/2019 | Khorasaninejad et al. |
| 10,408,419 | B2 | 9/2019 | Aieta et al. |
| 10,416,565 | B2 | 9/2019 | Ahmed et al. |
| 10,435,814 | B2 | 10/2019 | Plummer et al. |
| 10,440,244 | B2 | 10/2019 | Rosenblatt et al. |
| 10,440,300 | B2 | 10/2019 | Rephaeli et al. |
| 10,466,394 | B2 | 11/2019 | Lin et al. |
| 10,468,447 | B2 | 11/2019 | Akselrod et al. |
| 10,481,317 | B2 | 11/2019 | Peroz et al. |
| 10,514,296 | B2 | 12/2019 | Han et al. |
| 10,527,832 | B2 | 1/2020 | Schwab et al. |

(56) References Cited

U.S. PATENT DOCUMENTS

| | | | |
|---|---|---|---|
| 10,527,851 B2 | 1/2020 | Lin et al. | |
| 10,536,688 B2 | 1/2020 | Haas et al. | |
| 10,539,723 B2 | 1/2020 | Tazikov et al. | |
| 10,545,323 B2 | 1/2020 | Schwab et al. | |
| 10,591,643 B2 | 3/2020 | Lin et al. | |
| 10,670,782 B2 | 6/2020 | Arbabi et al. | |
| 10,725,290 B2 | 7/2020 | Fan et al. | |
| 10,795,168 B2 | 10/2020 | Riley et al. | |
| 10,816,704 B2 | 10/2020 | Arbabi et al. | |
| 10,816,815 B2 | 10/2020 | Aieta et al. | |
| 10,915,737 B2 | 2/2021 | Hu et al. | |
| 10,916,060 B2 | 2/2021 | West et al. | |
| 11,092,717 B2 | 8/2021 | Capasso et al. | |
| 11,169,311 B2 | 11/2021 | Rubin et al. | |
| 11,231,544 B2 | 1/2022 | Lin et al. | |
| 11,298,052 B2 | 4/2022 | Palikaras et al. | |
| 11,353,626 B2 | 6/2022 | You et al. | |
| 11,366,296 B2 | 6/2022 | Devlin et al. | |
| 11,385,104 B2 | 7/2022 | Yao et al. | |
| 11,385,516 B2 | 7/2022 | Didomenico | |
| 11,578,968 B1 | 2/2023 | Capasso et al. | |
| 11,579,456 B2 | 2/2023 | Riley et al. | |
| 11,604,364 B2 | 3/2023 | Rubin et al. | |
| 11,733,535 B2 | 8/2023 | Aieta et al. | |
| 11,815,668 B2 | 11/2023 | Devlin et al. | |
| 11,835,680 B2 | 12/2023 | Groever et al. | |
| 11,835,681 B2 | 12/2023 | Lin et al. | |
| 11,867,937 B2 | 1/2024 | Rubin et al. | |
| 11,927,769 B2 | 3/2024 | Devlin et al. | |
| 11,978,752 B2 | 5/2024 | Devlin et al. | |
| 12,541,040 B2 * | 2/2026 | Hansen | G02B 1/002 |
| 2002/0048727 A1 | 4/2002 | Zhou et al. | |
| 2002/0118903 A1 | 8/2002 | Cottrell et al. | |
| 2002/0181126 A1 | 12/2002 | Nishioka | |
| 2003/0077983 A1 | 4/2003 | Hagan et al. | |
| 2003/0107787 A1 | 6/2003 | Bablumyan | |
| 2004/0173738 A1 | 9/2004 | Mizuno | |
| 2004/0184752 A1 | 9/2004 | Aoki et al. | |
| 2004/0190116 A1 | 9/2004 | Lezec et al. | |
| 2004/0258128 A1 | 12/2004 | Johs et al. | |
| 2005/0151698 A1 | 7/2005 | Mohamadi | |
| 2005/0161589 A1 | 7/2005 | Kim et al. | |
| 2005/0211665 A1 | 9/2005 | Gao et al. | |
| 2005/0220162 A1 | 10/2005 | Nakamura | |
| 2005/0239003 A1 | 10/2005 | Chiodini et al. | |
| 2006/0042322 A1 | 3/2006 | Mendoza et al. | |
| 2006/0127829 A1 | 6/2006 | Deng et al. | |
| 2007/0024975 A1 | 2/2007 | McGrew | |
| 2007/0026585 A1 | 2/2007 | Wong et al. | |
| 2007/0030870 A1 | 2/2007 | Bour et al. | |
| 2007/0273957 A1 | 11/2007 | Zalevsky et al. | |
| 2008/0014632 A1 | 1/2008 | Cunningham et al. | |
| 2009/0128908 A1 | 5/2009 | Nakazawa et al. | |
| 2009/0135086 A1 | 5/2009 | Fuller et al. | |
| 2009/0230333 A1 | 9/2009 | Eleftheriades | |
| 2009/0296223 A1 | 12/2009 | Werner et al. | |
| 2010/0033701 A1 | 2/2010 | Lee et al. | |
| 2010/0055621 A1 | 3/2010 | Hatakeyama et al. | |
| 2010/0072170 A1 | 3/2010 | Wu et al. | |
| 2010/0091224 A1 | 4/2010 | Cho et al. | |
| 2010/0110430 A1 | 5/2010 | Ebbesen et al. | |
| 2010/0110433 A1 | 5/2010 | Nedelcu et al. | |
| 2010/0134869 A1 | 6/2010 | Bernet et al. | |
| 2010/0177164 A1 | 7/2010 | Zalevsky et al. | |
| 2010/0187658 A1 | 7/2010 | Wei | |
| 2010/0226134 A1 | 9/2010 | Capasso et al. | |
| 2010/0232017 A1 | 9/2010 | Mccarthy et al. | |
| 2010/0255428 A1 | 10/2010 | Chen et al. | |
| 2010/0259804 A1 | 10/2010 | Buschbeck et al. | |
| 2011/0012807 A1 | 1/2011 | Sorvala | |
| 2011/0019180 A1 | 1/2011 | Kruglick | |
| 2011/0102877 A1 | 5/2011 | Parriaux | |
| 2011/0149251 A1 | 6/2011 | Duelli | |
| 2011/0187577 A1 | 8/2011 | Fuller et al. | |
| 2011/0261441 A1 | 10/2011 | Zheludev et al. | |
| 2012/0008133 A1 | 1/2012 | Silny et al. | |
| 2012/0068347 A1 | 3/2012 | Isobayashi et al. | |
| 2012/0092735 A1 | 4/2012 | Futterer et al. | |
| 2012/0140235 A1 | 6/2012 | Lee et al. | |
| 2012/0258407 A1 | 10/2012 | Sirat | |
| 2012/0269483 A1 | 10/2012 | Mossberg et al. | |
| 2012/0293854 A1 | 11/2012 | Zheludev et al. | |
| 2012/0327666 A1 | 12/2012 | Liu et al. | |
| 2012/0328240 A1 | 12/2012 | Ma et al. | |
| 2013/0016030 A1 | 1/2013 | Liu et al. | |
| 2013/0032949 A1 | 2/2013 | Lin et al. | |
| 2013/0037873 A1 | 2/2013 | Suzuki et al. | |
| 2013/0050285 A1 | 2/2013 | Takahashi et al. | |
| 2013/0058071 A1 | 3/2013 | Ben | |
| 2013/0194537 A1 | 8/2013 | Mao et al. | |
| 2013/0194787 A1 | 8/2013 | Geske et al. | |
| 2013/0208332 A1 | 8/2013 | Yu et al. | |
| 2014/0009823 A1 | 1/2014 | Park et al. | |
| 2014/0043846 A1 | 2/2014 | Yang et al. | |
| 2014/0085693 A1 | 3/2014 | Mosallaei et al. | |
| 2014/0210835 A1 | 7/2014 | Hong et al. | |
| 2014/0263982 A1 | 9/2014 | Shkunov et al. | |
| 2014/0277433 A1 | 9/2014 | Pugh et al. | |
| 2015/0011073 A1 | 1/2015 | Lei et al. | |
| 2015/0017466 A1 | 1/2015 | Ayon et al. | |
| 2015/0018500 A1 | 1/2015 | Gerber et al. | |
| 2015/0055745 A1 | 2/2015 | Holzner et al. | |
| 2015/0068599 A1 | 3/2015 | Chou et al. | |
| 2015/0090862 A1 | 4/2015 | Matsui et al. | |
| 2015/0092139 A1 | 4/2015 | Eguchi | |
| 2015/0098002 A1 | 4/2015 | Wang | |
| 2015/0116721 A1 | 4/2015 | Kats et al. | |
| 2015/0125111 A1 | 5/2015 | Orcutt et al. | |
| 2015/0185413 A1 | 7/2015 | Greiner et al. | |
| 2015/0219497 A1 | 8/2015 | Johs et al. | |
| 2015/0219806 A1 | 8/2015 | Arbabi et al. | |
| 2015/0241608 A1 | 8/2015 | Shian et al. | |
| 2015/0316717 A1 | 11/2015 | Astratov | |
| 2016/0025914 A1 | 1/2016 | Brongersma et al. | |
| 2016/0037146 A1 | 2/2016 | McGrew | |
| 2016/0077261 A1 | 3/2016 | Arbabi et al. | |
| 2016/0133762 A1 | 5/2016 | Blasco Claret et al. | |
| 2016/0161826 A1 | 6/2016 | Shen et al. | |
| 2016/0195705 A1 | 7/2016 | Betzig et al. | |
| 2016/0253551 A1 | 9/2016 | Pezzaniti et al. | |
| 2016/0254638 A1 | 9/2016 | Chen et al. | |
| 2016/0276979 A1 | 9/2016 | Shaver et al. | |
| 2016/0299337 A1 | 10/2016 | Arbabi et al. | |
| 2016/0299426 A1 | 10/2016 | Gates et al. | |
| 2016/0306079 A1 | 10/2016 | Arbabi et al. | |
| 2016/0306157 A1 | 10/2016 | Rho et al. | |
| 2016/0318067 A1 | 11/2016 | Banerjee et al. | |
| 2016/0331457 A1 | 11/2016 | Varghese et al. | |
| 2016/0341859 A1 | 11/2016 | Shvets et al. | |
| 2016/0359235 A1 | 12/2016 | Driscoll et al. | |
| 2016/0361002 A1 | 12/2016 | Palikaras et al. | |
| 2016/0370568 A1 | 12/2016 | Toussaint et al. | |
| 2017/0003169 A1 | 1/2017 | Shaltout et al. | |
| 2017/0010466 A1 | 1/2017 | Klug et al. | |
| 2017/0030773 A1 | 2/2017 | Han et al. | |
| 2017/0038574 A1 | 2/2017 | Zhuang et al. | |
| 2017/0045652 A1 | 2/2017 | Arbabi et al. | |
| 2017/0082263 A1 | 3/2017 | Byrnes et al. | |
| 2017/0090221 A1 | 3/2017 | Atwater | |
| 2017/0121843 A1 | 5/2017 | Plummer et al. | |
| 2017/0125911 A1 | 5/2017 | Alu et al. | |
| 2017/0131460 A1 | 5/2017 | Lin et al. | |
| 2017/0146806 A1 | 5/2017 | Lin et al. | |
| 2017/0176758 A1 | 6/2017 | Lerner et al. | |
| 2017/0186166 A1 | 6/2017 | Grunnet-jepsen et al. | |
| 2017/0201658 A1 | 7/2017 | Rosenblatt et al. | |
| 2017/0212285 A1 | 7/2017 | Arbabi et al. | |
| 2017/0219739 A1 | 8/2017 | Lin et al. | |
| 2017/0235162 A1 | 8/2017 | Shaltout et al. | |
| 2017/0250577 A1 | 8/2017 | Ho et al. | |
| 2017/0293141 A1 | 10/2017 | Schowengerdt et al. | |
| 2017/0299784 A1 | 10/2017 | Mikkelsen et al. | |
| 2017/0310907 A1 | 10/2017 | Wang | |
| 2017/0322418 A1 | 11/2017 | Lin et al. | |

(56) References Cited

U.S. PATENT DOCUMENTS

| | | | |
|---|---|---|---|
| 2017/0329201 | A1 | 11/2017 | Arnold |
| 2017/0374352 | A1 | 12/2017 | Horesh |
| 2018/0035101 | A1 | 2/2018 | Osterhout |
| 2018/0044234 | A1 | 2/2018 | Hokansson et al. |
| 2018/0045953 | A1 | 2/2018 | Fan et al. |
| 2018/0052276 | A1 | 2/2018 | Klienman et al. |
| 2018/0052320 | A1 | 2/2018 | Curtis et al. |
| 2018/0107015 | A1 | 4/2018 | Dümpelmann et al. |
| 2018/0109002 | A1 | 4/2018 | Foo |
| 2018/0129866 | A1 | 5/2018 | Hicks et al. |
| 2018/0172988 | A1 | 6/2018 | Ahmed et al. |
| 2018/0184065 | A1 | 6/2018 | Zhao et al. |
| 2018/0216797 | A1 | 8/2018 | Khorasaninejad et al. |
| 2018/0217395 | A1 | 8/2018 | Lin et al. |
| 2018/0231700 | A1 | 8/2018 | Ahmed et al. |
| 2018/0231702 | A1 | 8/2018 | Lin et al. |
| 2018/0236596 | A1 | 8/2018 | Ihlemann et al. |
| 2018/0246262 | A1 | 8/2018 | Zhan et al. |
| 2018/0248268 | A1 | 8/2018 | Shvets et al. |
| 2018/0252857 | A1 | 9/2018 | Glik et al. |
| 2018/0259700 | A1 | 9/2018 | Khorasaninejad et al. |
| 2018/0259757 | A1 | 9/2018 | Urzhumov |
| 2018/0267605 | A1 | 9/2018 | Border |
| 2018/0274750 | A1 | 9/2018 | Byrnes et al. |
| 2018/0292644 | A1 | 10/2018 | Kamali et al. |
| 2018/0299595 | A1 | 10/2018 | Arbabi et al. |
| 2018/0314130 | A1 | 11/2018 | Joo et al. |
| 2018/0341090 | A1 | 11/2018 | Devlin et al. |
| 2018/0364158 | A1 | 12/2018 | Wang et al. |
| 2019/0003892 | A1 | 1/2019 | Aieta et al. |
| 2019/0025463 | A1 | 1/2019 | She et al. |
| 2019/0025477 | A1 | 1/2019 | She et al. |
| 2019/0041642 | A1 | 2/2019 | Haddick et al. |
| 2019/0041660 | A1 | 2/2019 | Ahmed |
| 2019/0041736 | A1 | 2/2019 | Grunnet-jepsen et al. |
| 2019/0044003 | A1 | 2/2019 | Heck et al. |
| 2019/0049632 | A1 | 2/2019 | Shin et al. |
| 2019/0049732 | A1 | 2/2019 | Lee et al. |
| 2019/0057512 | A1 | 2/2019 | Han et al. |
| 2019/0064532 | A1 | 2/2019 | Riley et al. |
| 2019/0079321 | A1 | 3/2019 | Wu et al. |
| 2019/0086579 | A1 | 3/2019 | Kim et al. |
| 2019/0086683 | A1 | 3/2019 | Aieta et al. |
| 2019/0101448 | A1 | 4/2019 | Lee et al. |
| 2019/0113775 | A1 | 4/2019 | Jang et al. |
| 2019/0120817 | A1 | 4/2019 | Anderson |
| 2019/0121004 | A1 | 4/2019 | Ahmed et al. |
| 2019/0137075 | A1 | 5/2019 | Aieta et al. |
| 2019/0137762 | A1 | 5/2019 | Hu |
| 2019/0137793 | A1 | 5/2019 | Luo et al. |
| 2019/0154877 | A1* | 5/2019 | Capasso ................. G02B 1/002 |
| 2019/0155302 | A1 | 5/2019 | Lukierski et al. |
| 2019/0157830 | A1 | 5/2019 | Tong et al. |
| 2019/0162592 | A1 | 5/2019 | Khorasaninejad et al. |
| 2019/0170655 | A1 | 6/2019 | Smith |
| 2019/0191144 | A1 | 6/2019 | Arbabi et al. |
| 2019/0196068 | A1 | 6/2019 | Tsai et al. |
| 2019/0206136 | A1 | 7/2019 | West et al. |
| 2019/0219835 | A1 | 7/2019 | Skinner et al. |
| 2019/0235139 | A1 | 8/2019 | Chen et al. |
| 2019/0250107 | A1 | 8/2019 | Sreenivasan et al. |
| 2019/0369401 | A1 | 12/2019 | Rolland et al. |
| 2019/0377084 | A1 | 12/2019 | Sleasman et al. |
| 2019/0386749 | A1 | 12/2019 | Lezec et al. |
| 2019/0391378 | A1 | 12/2019 | Eichelkraut et al. |
| 2020/0025888 | A1 | 1/2020 | Jang et al. |
| 2020/0052027 | A1 | 2/2020 | Arbabi et al. |
| 2020/0076163 | A1 | 3/2020 | Han et al. |
| 2020/0083666 | A1 | 3/2020 | Fallahi et al. |
| 2020/0096672 | A1 | 3/2020 | Yu et al. |
| 2020/0150311 | A1 | 5/2020 | Zhang et al. |
| 2020/0225386 | A1 | 7/2020 | Tsai et al. |
| 2020/0236315 | A1 | 7/2020 | Kimura |
| 2020/0249429 | A1 | 8/2020 | Han et al. |
| 2020/0271941 | A1 | 8/2020 | Riley et al. |
| 2020/0272100 | A1 | 8/2020 | Yu et al. |
| 2020/0284960 | A1 | 9/2020 | Ellenbogen et al. |
| 2020/0355913 | A1 | 11/2020 | Park et al. |
| 2021/0028215 | A1 | 1/2021 | Devlin et al. |
| 2021/0048569 | A1 | 2/2021 | Rubin et al. |
| 2021/0109364 | A1 | 4/2021 | Aieta et al. |
| 2021/0112201 | A1 | 4/2021 | Cho et al. |
| 2021/0149081 | A1 | 5/2021 | Groever et al. |
| 2021/0190593 | A1 | 6/2021 | Yao |
| 2021/0200992 | A1 | 7/2021 | Padmanabhan et al. |
| 2021/0208469 | A1 | 7/2021 | Didomenico |
| 2021/0263329 | A1 | 8/2021 | Latawiec |
| 2021/0286188 | A1 | 9/2021 | Rubin et al. |
| 2021/0288095 | A1 | 9/2021 | Delga et al. |
| 2021/0302763 | A1 | 9/2021 | Yao et al. |
| 2021/0311588 | A1 | 10/2021 | Han et al. |
| 2021/0318466 | A1 | 10/2021 | Uenoyama et al. |
| 2021/0318467 | A1 | 10/2021 | Zhou et al. |
| 2021/0333150 | A1 | 10/2021 | McEldowney et al. |
| 2022/0050225 | A1 | 2/2022 | Li et al. |
| 2022/0050294 | A1 | 2/2022 | Fermigier et al. |
| 2022/0052093 | A1 | 2/2022 | Devlin et al. |
| 2022/0091428 | A1 | 3/2022 | Riley et al. |
| 2022/0107263 | A1 | 4/2022 | Biesinger et al. |
| 2022/0206186 | A1 | 6/2022 | Chen et al. |
| 2022/0206205 | A1 | 6/2022 | Rubin et al. |
| 2022/0214219 | A1 | 7/2022 | Faraon et al. |
| 2022/0244442 | A1 | 8/2022 | Rubin et al. |
| 2022/0283411 | A1 | 9/2022 | Devlin et al. |
| 2023/0194883 | A1 | 6/2023 | Riley et al. |
| 2023/0196842 | A1 | 6/2023 | Devlin et al. |
| 2023/0208104 | A1 | 6/2023 | Tamagnone et al. |
| 2023/0280498 | A1 | 9/2023 | Altuzarra et al. |
| 2023/0288716 | A1 | 9/2023 | Rubin et al. |
| 2023/0314827 | A1 | 10/2023 | Devlin et al. |
| 2023/0318261 | A1 | 10/2023 | Tamagnone et al. |
| 2024/0012177 | A1 | 1/2024 | Forouzmand et al. |
| 2024/0061219 | A1 | 2/2024 | Devlin et al. |
| 2024/0234461 | A1 | 7/2024 | Devlin et al. |
| 2025/0362522 | A1* | 11/2025 | Morita ..................... G02B 5/30 |

FOREIGN PATENT DOCUMENTS

| | | | |
|---|---|---|---|
| CA | 3064764 | A1 | 11/2018 |
| CA | 108761779 | A | 11/2018 |
| CN | 1044991 | A | 8/1990 |
| CN | 101158727 | A | 4/2008 |
| CN | 101164147 | A | 4/2008 |
| CN | 100476504 | C | 4/2009 |
| CN | 101546002 | A | 9/2009 |
| CN | 101681095 | A | 3/2010 |
| CN | 101510013 | B | 6/2010 |
| CN | 101510012 | B | 8/2010 |
| CN | 101510011 | B | 9/2010 |
| CN | 101241173 | B | 8/2011 |
| CN | 202854395 | U | 4/2013 |
| CN | 103092049 | A | 5/2013 |
| CN | 203799117 | U | 8/2014 |
| CN | 104067171 | A | 9/2014 |
| CN | 104374745 | A | 2/2015 |
| CN | 204422813 | U | 6/2015 |
| CN | 104932043 | A | 9/2015 |
| CN | 104956491 | A | 9/2015 |
| CN | 204719330 | U | 10/2015 |
| CN | 105068396 | A | 11/2015 |
| CN | 103869484 | B | 1/2016 |
| CN | 105223689 | A | 1/2016 |
| CN | 105278026 | A | 1/2016 |
| CN | 105278309 | A | 1/2016 |
| CN | 105655286 | A | 6/2016 |
| CN | 105676314 | A | 6/2016 |
| CN | 105917277 | A | 8/2016 |
| CN | 105974503 | A | 9/2016 |
| CN | 103257441 | B | 10/2016 |
| CN | 205620619 | U | 10/2016 |
| CN | 104834079 | B | 4/2017 |
| CN | 106611699 | A | 5/2017 |
| CN | 104834089 | B | 6/2017 |
| CN | 106848555 | A | 6/2017 |

(56) References Cited

FOREIGN PATENT DOCUMENTS

| | | | |
|---|---|---|---|
| CN | 106200276 | B | 10/2017 |
| CN | 104834088 | B | 12/2017 |
| CN | 105676314 | B | 1/2018 |
| CN | 107561857 | A | 1/2018 |
| CN | 108089325 | A | 5/2018 |
| CN | 108291983 | A | 7/2018 |
| CN | 207623619 | U | 7/2018 |
| CN | 106199997 | B | 8/2018 |
| CN | 108474869 | A | 8/2018 |
| CN | 108507542 | A | 9/2018 |
| CN | 207923075 | U | 9/2018 |
| CN | 108680544 | A | 10/2018 |
| CN | 109000692 | A | 12/2018 |
| CN | 208270846 | U | 12/2018 |
| CN | 109196387 | A | 1/2019 |
| CN | 208421387 | U | 1/2019 |
| CN | 106199956 | B | 2/2019 |
| CN | 109360139 | A | 2/2019 |
| CN | 106950195 | B | 5/2019 |
| CN | 106324832 | B | 7/2019 |
| CN | 106526730 | B | 7/2019 |
| CN | 106485761 | B | 8/2019 |
| CN | 110160685 | A | 8/2019 |
| CN | 110678773 | A | 1/2020 |
| CN | 108474869 | B | 6/2020 |
| CN | 111316138 | A | 6/2020 |
| CN | 111580190 | A | 8/2020 |
| CN | 111656707 | A | 9/2020 |
| CN | 111819489 | A | 10/2020 |
| CN | 213092332 | U | 4/2021 |
| CN | 113050295 | A | 6/2021 |
| CN | 113168022 | A | 7/2021 |
| CN | 110376665 | B | 8/2021 |
| CN | 213902664 | U | 8/2021 |
| CN | 213903843 | U | 8/2021 |
| CN | 214098104 | U | 8/2021 |
| CN | 113703080 | A | 11/2021 |
| CN | 111580190 | B | 12/2021 |
| CN | 113791524 | A | 12/2021 |
| CN | 113807312 | A | 12/2021 |
| CN | 113820839 | A | 12/2021 |
| CN | 113834568 | A | 12/2021 |
| CN | 113835227 | A | 12/2021 |
| CN | 113851573 | A | 12/2021 |
| CN | 215005942 | U | 12/2021 |
| CN | 215010478 | U | 12/2021 |
| CN | 110494771 | B | 1/2022 |
| CN | 113885106 | A | 1/2022 |
| CN | 113899451 | A | 1/2022 |
| CN | 113900078 | A | 1/2022 |
| CN | 113900162 | A | 1/2022 |
| CN | 113906320 | A | 1/2022 |
| CN | 113917574 | A | 1/2022 |
| CN | 113917578 | A | 1/2022 |
| CN | 113934004 | A | 1/2022 |
| CN | 113934005 | A | 1/2022 |
| CN | 113959984 | A | 1/2022 |
| CN | 114002707 | A | 2/2022 |
| CN | 114019589 | A | 2/2022 |
| CN | 114047632 | A | 2/2022 |
| CN | 114047637 | A | 2/2022 |
| CN | 114112058 | A | 3/2022 |
| CN | 114156168 | A | 3/2022 |
| CN | 114176492 | A | 3/2022 |
| CN | 215932365 | U | 3/2022 |
| CN | 114280704 | A | 4/2022 |
| CN | 114280716 | A | 4/2022 |
| CN | 114286953 | A | 4/2022 |
| CN | 114296180 | A | 4/2022 |
| CN | 114325886 | A | 4/2022 |
| CN | 114326163 | A | 4/2022 |
| CN | 114354141 | A | 4/2022 |
| CN | 114373825 | A | 4/2022 |
| CN | 114384612 | A | 4/2022 |
| CN | 114397092 | A | 4/2022 |

| | | | |
|---|---|---|---|
| CN | 114397718 | A | 4/2022 |
| CN | 114415386 | A | 4/2022 |
| CN | 216345776 | U | 4/2022 |
| CN | 216351311 | U | 4/2022 |
| CN | 216351591 | U | 4/2022 |
| CN | 216355281 | U | 4/2022 |
| CN | 216361353 | U | 4/2022 |
| CN | 111316138 | B | 5/2022 |
| CN | 114488365 | A | 5/2022 |
| CN | 114543993 | A | 5/2022 |
| CN | 114545367 | A | 5/2022 |
| CN | 114545370 | A | 5/2022 |
| CN | 114554062 | A | 5/2022 |
| CN | 114561266 | A | 5/2022 |
| CN | 216593224 | U | 5/2022 |
| CN | 216605227 | U | 5/2022 |
| CN | 216622749 | U | 5/2022 |
| CN | 114578642 | A | 6/2022 |
| CN | 114593689 | A | 6/2022 |
| CN | 114623960 | A | 6/2022 |
| CN | 114624878 | A | 6/2022 |
| CN | 114660683 | A | 6/2022 |
| CN | 114660780 | A | 6/2022 |
| CN | 114690387 | A | 7/2022 |
| CN | 114740631 | A | 7/2022 |
| CN | 114743714 | A | 7/2022 |
| CN | 114779437 | U | 7/2022 |
| CN | 216896898 | U | 7/2022 |
| CN | 216900930 | U | 7/2022 |
| CN | 216901121 | U | 7/2022 |
| CN | 216901165 | U | 7/2022 |
| CN | 216901317 | U | 7/2022 |
| CN | 216901952 | U | 7/2022 |
| CN | 216903719 | U | 7/2022 |
| CN | 216933177 | U | 7/2022 |
| CN | 217034311 | U | 7/2022 |
| CN | 217034418 | U | 7/2022 |
| CN | 217034466 | U | 7/2022 |
| CN | 114859446 | A | 8/2022 |
| CN | 114859447 | A | 8/2022 |
| CN | 114859570 | A | 8/2022 |
| CN | 114935741 | A | 8/2022 |
| CN | 217276608 | U | 8/2022 |
| CN | 217278911 | U | 8/2022 |
| CN | 217278915 | U | 8/2022 |
| CN | 217278989 | U | 8/2022 |
| CN | 217279003 | U | 8/2022 |
| CN | 217279087 | U | 8/2022 |
| CN | 217279110 | U | 8/2022 |
| CN | 217279168 | U | 8/2022 |
| CN | 217279244 | U | 8/2022 |
| CN | 217280797 | U | 8/2022 |
| CN | 217280851 | U | 8/2022 |
| CN | 217281621 | U | 8/2022 |
| CN | 217281623 | U | 8/2022 |
| CN | 114995038 | A | 9/2022 |
| CN | 115016099 | A | 9/2022 |
| CN | 115016150 | A | 9/2022 |
| CN | 115032766 | A | 9/2022 |
| CN | 115047432 | A | 9/2022 |
| CN | 115047548 | A | 9/2022 |
| CN | 115047653 | A | 9/2022 |
| CN | 115061114 | A | 9/2022 |
| CN | 115079415 | A | 9/2022 |
| CN | 115113174 | A | 9/2022 |
| CN | 217456368 | U | 9/2022 |
| CN | 217465697 | U | 9/2022 |
| CN | 217466052 | U | 9/2022 |
| CN | 217466667 | U | 9/2022 |
| CN | 217467162 | U | 9/2022 |
| CN | 217467176 | U | 9/2022 |
| CN | 217467177 | U | 9/2022 |
| CN | 217467226 | U | 9/2022 |
| CN | 217467326 | U | 9/2022 |
| CN | 217467327 | U | 9/2022 |
| CN | 217467336 | U | 9/2022 |
| CN | 217467338 | U | 9/2022 |
| CN | 217467351 | U | 9/2022 |
| CN | 217467352 | U | 9/2022 |

(56) References Cited

FOREIGN PATENT DOCUMENTS

CN 217467353 U 9/2022
CN 217467355 U 9/2022
CN 217467357 U 9/2022
CN 217467358 U 9/2022
CN 217467363 U 9/2022
CN 217467364 U 9/2022
CN 217467367 U 9/2022
CN 217467368 U 9/2022
CN 217467395 U 9/2022
CN 217467396 U 9/2022
CN 217467399 U 9/2022
CN 217467439 U 9/2022
CN 217467452 U 9/2022
CN 115164714 A 10/2022
CN 115166876 A 10/2022
CN 115166958 A 10/2022
CN 115185082 A 10/2022
CN 115211799 A 10/2022
CN 115236795 A 10/2022
CN 217639515 U 10/2022
CN 217639519 U 10/2022
CN 217639539 U 10/2022
CN 217639544 U 10/2022
CN 217639611 U 10/2022
CN 217639612 U 10/2022
CN 217639613 U 10/2022
CN 217639715 U 10/2022
CN 217639718 U 10/2022
CN 217639719 U 10/2022
CN 217639720 U 10/2022
CN 217639722 U 10/2022
CN 217639723 U 10/2022
CN 217639724 U 10/2022
CN 217639725 U 10/2022
CN 217639726 U 10/2022
CN 217639763 U 10/2022
CN 217639765 U 10/2022
CN 217639767 U 10/2022
CN 217639768 U 10/2022
CN 217639769 U 10/2022
CN 217639770 U 10/2022
CN 217639771 U 10/2022
CN 217639772 U 10/2022
CN 217639773 U 10/2022
CN 217639774 U 10/2022
CN 217639776 U 10/2022
CN 217639777 U 10/2022
CN 217639778 U 10/2022
CN 217639903 U 10/2022
CN 217639920 U 10/2022
CN 115268058 A 11/2022
CN 115327865 A 11/2022
CN 115332917 A 11/2022
CN 115343795 A 11/2022
CN 115390176 A 11/2022
CN 217809433 U 11/2022
CN 217818613 U 11/2022
CN 217819022 U 11/2022
CN 217820828 U 11/2022
CN 217820829 U 11/2022
CN 217820831 U 11/2022
CN 217820834 U 11/2022
CN 217820838 U 11/2022
CN 217820839 U 11/2022
CN 217820840 U 11/2022
CN 217820943 U 11/2022
CN 217820944 U 11/2022
CN 217820945 U 11/2022
CN 217820971 U 11/2022
CN 217821058 U 11/2022
CN 217821068 U 11/2022
CN 217821071 U 11/2022
CN 217821091 U 11/2022
CN 217821110 U 11/2022
CN 217821111 U 11/2022
CN 217821113 U 11/2022
CN 217821122 U 11/2022
CN 217821160 U 11/2022
CN 217821236 U 11/2022
CN 217821680 U 11/2022
CN 217821696 U 11/2022
CN 217822825 U 11/2022
CN 217823690 U 11/2022
CN 217825178 U 11/2022
CN 217885960 U 11/2022
CN 217902220 U 11/2022
CN 217902222 U 11/2022
CN 115421295 A 12/2022
CN 115453754 A 12/2022
CN 115524768 A 12/2022
CN 115524775 A 12/2022
CN 115524874 A 12/2022
CN 217981833 U 12/2022
CN 217981857 U 12/2022
CN 217981991 U 12/2022
CN 217981992 U 12/2022
CN 217982020 U 12/2022
CN 217982038 U 12/2022
CN 217982089 U 12/2022
CN 217982120 U 12/2022
CN 217983382 U 12/2022
CN 217984044 U 12/2022
CN 115812169 A 3/2023
CN 116745685 A 9/2023
CN 116940866 A 10/2023
DE 102007058558 A1 6/2009
DE 102009037629 A1 2/2011
DE 102012212753 A1 1/2014
DE 102015221985 A1 5/2017
DE 102016218996 A1 9/2017
DE 112018002811 T5 2/2020
DE 112018002670 T5 3/2020
EP 1251397 A2 10/2002
EP 1252623 B1 10/2004
EP 2631740 A2 8/2013
EP 2763519 A2 8/2014
EP 2338114 B1 3/2017
EP 3226042 A1 10/2017
EP 3353578 A1 8/2018
EP 3380876 A1 10/2018
EP 3385770 A1 10/2018
EP 3440484 A1 2/2019
EP 3504566 A2 7/2019
EP 3620833 A1 3/2020
EP 3631533 A1 4/2020
EP 3676973 A1 7/2020
EP 3743764 A1 12/2020
EP 3353578 B1 1/2021
EP 3799626 A1 4/2021
EP 3956702 A1 2/2022
EP 4004608 A1 6/2022
EP 4147311 A1 3/2023
EP 4268009 A1 11/2023
EP 4275080 A1 11/2023
EP 3380876 B1 2/2024
GB 2490895 A 11/2012
GB 2499869 B 3/2018
GB 2578049 A 4/2020
GB 2578233 A 4/2020
GB 2578236 A 4/2020
GB 2578236 B 11/2022
HK 40010538 7/2020
JP 2004302457 A 10/2004
JP 2005017408 A 1/2005
JP 2005274847 A 10/2005
JP 2008046428 A 2/2008
JP 2008299084 A 12/2008
JP 2010085977 A 4/2010
JP 2015502581 A 1/2015
JP 2015092234 A 5/2015
JP 2016511936 A 4/2016
JP 2017062373 A 3/2017
JP 2018536204 A 12/2018
JP 2018537804 A 12/2018

(56) References Cited

FOREIGN PATENT DOCUMENTS

| | | | |
|---|---|---|---|
| JP | 2019516128 | A | 6/2019 |
| JP | 2020522009 | A | 7/2020 |
| JP | 2021511553 | A | 5/2021 |
| JP | 6925358 | B2 | 8/2021 |
| JP | 2022542172 | A | 9/2022 |
| KR | 20080099452 | A | 11/2008 |
| KR | 20080103149 | A | 11/2008 |
| KR | 20090002583 | A | 1/2009 |
| KR | 20100027995 | A | 3/2010 |
| KR | 101493928 | B1 | 3/2015 |
| KR | 20150113041 | A | 10/2015 |
| KR | 20170015109 | A | 2/2017 |
| KR | 20180083885 | A | 7/2018 |
| KR | 20180121309 | A | 11/2018 |
| KR | 20180124106 | A | 11/2018 |
| KR | 101905444 | B1 | 12/2018 |
| KR | 20190038221 | A | 4/2019 |
| KR | 102036640 | B1 | 10/2019 |
| KR | 1020200008630 | A | 1/2020 |
| KR | 1020200108901 | A | 9/2020 |
| KR | 20210088520 | A | 7/2021 |
| KR | 10-2363805 | B1 | 2/2022 |
| KR | 1020220035971 | A | 3/2022 |
| SG | 11201804346 | P | 6/2018 |
| SG | 11201808772 | W | 11/2018 |
| SG | 11202001717 | | 2/2023 |
| SG | 11202006952 | A | 2/2023 |
| SG | 11202013228 | A | 2/2024 |
| TW | 201017338 | A | 5/2010 |
| TW | 201438242 | A | 10/2014 |
| TW | 201908232 | A | 3/2019 |
| WO | 2000043750 | A2 | 7/2000 |
| WO | 2007141788 | A2 | 12/2007 |
| WO | 2008019803 | A1 | 2/2008 |
| WO | 2008020899 | A2 | 2/2008 |
| WO | 2009067540 | A1 | 5/2009 |
| WO | 2009124181 | A2 | 10/2009 |
| WO | 2011106553 | A2 | 9/2011 |
| WO | 2011106553 | A3 | 1/2012 |
| WO | 2012122677 | A1 | 9/2012 |
| WO | 2012139634 | A1 | 10/2012 |
| WO | 2012144997 | A1 | 10/2012 |
| WO | 2012172366 | A1 | 12/2012 |
| WO | 2013033591 | A1 | 3/2013 |
| WO | 2014116500 | A1 | 7/2014 |
| WO | 2015021255 | A1 | 2/2015 |
| WO | 2015077926 | A1 | 6/2015 |
| WO | 2015112939 | A1 | 7/2015 |
| WO | 2015160412 | A2 | 10/2015 |
| WO | 2016049629 | A1 | 3/2016 |
| WO | 2016051325 | A1 | 4/2016 |
| WO | 2016086204 | A1 | 6/2016 |
| WO | 2016140720 | A2 | 9/2016 |
| WO | 2016140720 | A3 | 10/2016 |
| WO | 2016168173 | A1 | 10/2016 |
| WO | 2016178740 | A2 | 11/2016 |
| WO | 2016191142 | A2 | 12/2016 |
| WO | 2017005709 | A1 | 1/2017 |
| WO | 2017034995 | A1 | 3/2017 |
| WO | 2017040854 | A1 | 3/2017 |
| WO | 2017053309 | A1 | 3/2017 |
| WO | 2017079480 | A1 | 5/2017 |
| WO | 2017091738 | A1 | 6/2017 |
| WO | 2017176921 | A1 | 10/2017 |
| WO | 2017182771 | A1 | 10/2017 |
| WO | 2018063455 | A1 | 4/2018 |
| WO | 2018067246 | A2 | 4/2018 |
| WO | 2018063455 | A9 | 5/2018 |
| WO | 2018118984 | A1 | 6/2018 |
| WO | 2018134215 | A1 | 7/2018 |
| WO | 2018067246 | A3 | 8/2018 |
| WO | 2018142339 | A1 | 8/2018 |
| WO | 2018204856 | A1 | 11/2018 |
| WO | 2018218063 | A1 | 11/2018 |
| WO | 2018219710 | A1 | 12/2018 |
| WO | 2018222944 | A1 | 12/2018 |
| WO | 2019015735 | A1 | 1/2019 |
| WO | 2019039241 | A1 | 2/2019 |
| WO | 2019043016 | A1 | 3/2019 |
| WO | 2019046827 | A1 | 3/2019 |
| WO | 2019057907 | A1 | 3/2019 |
| WO | 2019075335 | A1 | 4/2019 |
| WO | 2019101750 | A2 | 5/2019 |
| WO | 2019103762 | A2 | 5/2019 |
| WO | 2019108290 | A1 | 6/2019 |
| WO | 2019113106 | A1 | 6/2019 |
| WO | 2019116364 | A1 | 6/2019 |
| WO | 2019118646 | A1 | 6/2019 |
| WO | 2019119025 | A1 | 6/2019 |
| WO | 2019103762 | A3 | 7/2019 |
| WO | 2019136166 | A1 | 7/2019 |
| WO | 2019103762 | A9 | 8/2019 |
| WO | 2019147828 | A1 | 8/2019 |
| WO | 2019148200 | A1 | 8/2019 |
| WO | 2019164542 | A1 | 8/2019 |
| WO | 2019164849 | A1 | 8/2019 |
| WO | 2019173357 | A1 | 9/2019 |
| WO | 2019198568 | A1 | 10/2019 |
| WO | 2019203876 | A2 | 10/2019 |
| WO | 2019204667 | A1 | 10/2019 |
| WO | 2019206430 | A1 | 10/2019 |
| WO | 2020001938 | A1 | 1/2020 |
| WO | 2020010084 | A1 | 1/2020 |
| WO | 2020101568 | A1 | 5/2020 |
| WO | 2020139752 | A1 | 7/2020 |
| WO | 2020176227 | A1 | 9/2020 |
| WO | 2020214615 | A1 | 10/2020 |
| WO | 2020214617 | A1 | 10/2020 |
| WO | 2020248046 | A1 | 12/2020 |
| WO | 2021021671 | A1 | 2/2021 |
| WO | 2021130085 | A1 | 7/2021 |
| WO | 2021226544 | A1 | 11/2021 |
| WO | 2021230868 | A1 | 11/2021 |
| WO | 2022146929 | A1 | 7/2022 |
| WO | 2022150816 | A1 | 7/2022 |
| WO | 2023115037 | A1 | 6/2023 |
| WO | 2024182628 | A1 | 9/2024 |

OTHER PUBLICATIONS

Extended European Search Report for European Application No. 17779772.7, Search completed Oct. 15, 2019, Mailed Oct. 25, 2019, 10 pgs.

Extended European Search Report for European Application No. 17858861.2, Search completed Mar. 13, 2020, Mailed Mar. 23, 2020, 9 pgs.

Extended European Search Report for European Application No. 18805669.1, Search completed Feb. 9, 2021, Mailed Feb. 18, 2021, 13 pgs.

Extended European Search Report for European Application No. 18852460.7, Search completed Mar. 25, 2021, Mailed Apr. 6, 2021, 13 pgs.

Extended European Search Report for European Application No. 19744012.6, Search completed Sep. 3, 2021, Mailed Dec. 16, 2021, 10 pgs.

Extended European Search Report for European Application No. 19830958.5, Search completed Feb. 17, 2022, Mailed Feb. 25, 2022, 8 pgs.

Extended European Search Report for European Application No. 20790964.9, Search completed Nov. 22, 2022, Mailed Dec. 2, 2022, 10 pgs.

Extended European Search Report for European Application No. 20847649.9, Search completed Jul. 20, 2023, Mailed Aug. 1, 2023, 11 pgs.

International Preliminary Report on Patentability for International Application No. PCT/US2008/084068, Report issued May 25, 2010, 5 pgs.

International Preliminary Report on Patentability for International Application No. PCT/US2012/053434, Report issued Mar. 4, 2014, Mailed Mar. 13, 2014, 7 pgs.

(56) References Cited

OTHER PUBLICATIONS

International Preliminary Report on Patentability for International Application No. PCT/US2015/064930, Report issued Jun. 13, 2017, Mailed Jun. 22, 2017, 9 pgs.
International Preliminary Report on Patentability for International Application No. PCT/US2016/052685, Report issued Mar. 27, 2018, Mailed Apr. 5, 2018, 9 pgs.
International Preliminary Report on Patentability for International Application No. PCT/US2016/063617, Report issued May 29, 2018, Mailed Jun. 7, 2018, 7 pgs.
International Preliminary Report on Patentability for International Application No. PCT/US2017/026206, Report issued Oct. 9, 2018, Mailed Oct. 18, 2018, 9 pgs.
International Preliminary Report on Patentability for International Application No. PCT/US2017/036897, Report issued Dec. 11, 2018, Mailed Dec. 20, 2018, 9 pgs.
International Preliminary Report on Patentability for International Application No. PCT/US2017/048469, Report issued Feb. 26, 2019, Mailed Mar. 7, 2019, 6 pgs.
International Preliminary Report on Patentability for International Application No. PCT/US2018/031204, Report issued Nov. 5, 2019, Mailed Nov. 14, 2019, 9 pgs.
International Preliminary Report on Patentability for International Application No. PCT/US2018/034460, Report issued Nov. 26, 2019, Mailed Dec. 5, 2019, 7 pgs.
International Preliminary Report on Patentability for International Application No. PCT/US2018/035502, Report issued Dec. 3, 2019, Mailed Dec. 12, 2019, 8 pgs.
International Preliminary Report on Patentability for International Application No. PCT/US2018/038357, Report issued Dec. 24, 2019, Mailed Jan. 2, 2020, 7 pgs.
International Preliminary Report on Patentability for International Application No. PCT/US2018/046947, Report issued Feb. 18, 2020, Mailed on Feb. 27, 2020, 7 pgs.
International Preliminary Report on Patentability for International Application No. PCT/US2018/049276, Report issued on Mar. 3, 2020, Mailed on Mar. 12, 2020, 9 pgs.
International Preliminary Report on Patentability for International Application No. PCT/US2019/040302, Report issued Jan. 5, 2021, Mailed Jan. 14, 2021, 6 pgs.
Dong et al., "Zero-Index Photonic Crystal as Low-Aberration Optical Lens (Conference Presentation)", Proceedings of SPIE, Metamaterials, Metadevices, and Metasystems, vol. 9918, No. 991822, Nov. 9, 2016, p. 991822-1, doi: 10.1117/12.2237137.
Engelberg et al., "Near-IR Wide-Field-of-View Huygens Metalens for Outdoor Imaging Applications", Nanophotonics, Aug. 10, 2019, vol. 9, No. 2, pp. 361-370, doi: 10.1515/nanoph-2019-0177.
Evlyukhin et al., "Optical response features of Si-nanoparticle arrays", Physical Review B, vol. 82, No. 045404, Jul. 8, 2010, pp. 045404-1-045404-11, doi: 10.1103/PhysRevB.82.045404.
Fattal et al., "Flat dielectric grating reflectors with focusing abilities", Nature Photonics, vol. 4, May 2, 2010, pp. 466-470, doi: 10.1038/nphoton.2010.116.
Fienup, "Phase retrieval algorithms: a comparison", Applied Optics, vol. 21, No. 15, Aug. 1, 1982, pp. 2758-2769, doi: 10.1364/AO.21.002758.
Genevet et al., "Breakthroughs in Photonics 2013: Flat Optics: Wavefronts Control with Huygens' Interfaces", IEEE Photonics Journal, vol. 6, No. 2, Article 0700404, Apr. 2014, 4 pgs., doi: 10.1109/JPHOT.2014.2308194.
Genevet et al., "Recent advances in planar optics: from plasmonic to dielectric metasurfaces", Optica, vol. 4, No. 1, Jan. 2017, pp. 139-152, doi: 10.1364/OPTICA.4.000139.
Gerchberg et al., "A Practical Algorithm for the Determination of Phase from Image and Diffraction Plane Pictures", Optik, vol. 35, No. 2, 1972, pp. 1-6.
Goldberg, "Genetic Algorithms in Search, Optimization, and Machine Learning", Addison Wesley, 1989, 432 pgs. (presented in 2 parts).
Gori, "Measuring Stokes parameters by means of a polarization grating", Optics Letters, vol. 24, No. 9, May 1, 1999, pp. 584-586, doi: 10.1364/OL.24.000584.
Groever et al., "Meta-Lens Doublet in the Visible Region", Nano Letters, vol. 17, No. 8, Jun. 29, 2017, pp. 4902-4907, doi: 10.1021/acs.nanolett.7b01888.
Gutierrez-Vega, "Optical phase of inhomogeneous Jones matrices: retardance and ortho-transmission states", Optics Letters, vol. 45, No. 7, Apr. 1, 2020, pp. 1639-1642, doi: 10.1364/OL.387644.
Hartwig et al., "Challenges for Reducing the Size of Laser Activated Remote Phosphor Light Engines for DLP Projection", Proceedings of SPIE, International Optical Design Conference, vol. 9293, Dec. 17, 2014, pp. 929313-1-929313-6, doi: 10.1117/12.2073275.
Hasman et al., "Chapter 4—Space-variant polarization manipulation", Progress in Optics, vol. 47, 2005, pp. 215-289, doi: 10.1016/S0079-6638(05)47004-3.
Herrera-Fernandez et al., "Double diffractive optical element system for near-field shaping", Applied Optics, vol. 50, No. 23, Aug. 10, 2011, pp. 4587-4593, doi: 10.1364/AO.50.004587.
Hidber et al., "Microcontact Printing of Palladium Colloids: Micron-Scale Patterning by Electroless Deposition of Copper", Langmuir, vol. 12, No. 5, Mar. 6, 1996, pp. 1375-1380, doi: 10.1021/la9507500.
Horie et al., "Reflective Optical Phase Modulator Based on High-Contrast Grating Mirrors", Conference on Lasers and Electro-Optics (CLEO)—Laser Science to Photonic Applications, 2014, 2 pgs., doi: 10.1364/CLEO_SI.2014.STh4M.8.
Hsiao et al., "Fundamentals and Applications of Metasurfaces", Small Methods, vol. 1, No. 4, Article 1600064, Mar. 24, 2017, 20 pgs., doi: 10.1002/smtd.201600064.
Jang et al., "Wavefront shaping with disorder-engineered metasurfaces", Nature Photonics, vol. 12, Jan. 15, 2018, pp. 84-90, doi: 10.1038/s41566-017-0078-z.
Jin et al., "Waveforms for optimal sub-keV high-order harmonics with synthesized two- or three-colour laser fields", Nature Communications, vol. 5, No. 4003, May 30, 2014, pp. 1-6, doi: 10.1038/ncomms5003.
Juan et al., "Arbitrary Polarization Transformation Based on Two-Dimensional Metallic Rectangular Gratings", Acta Optica Sinica, vol. 31, No. 12, Dec. 31, 2011, pp. 1224001-1-1224001-5, doi: 10.3788/A0S201131.1224001.
Karagodsky et al., "Monolithically integrated multi-wavelength VCSEL arrays using high-contrast gratings", Optics Express, vol. 18, No. 2, Jan. 18, 2010, pp. 694-699, doi: 10.1364/OE.18.000694.
Kats et al., "Giant birefringence in optical antenna arrays with widely tailorable optical anisotropy", PNAS, vol. 109, No. 31, Jul. 31, 2012, pp. 12364-12368, doi: 10.1073/pnas.1210686109.
Keller, "Instrumentation for Astrophysical Spectropolarimetry", Astrophysical Spectropolarimetry, 2001, pp. 303-354.
Khorasaninejad et al., "Achromatic Metalens over 60 nm Bandwidth in the Visible and Metalens with Reverse Chromatic Dispersion", Nano Letters, vol. 17, No. 3, Jan. 26, 2017, pp. 1819-1824, doi: 10.1021/acs.nanolett.6b05137.
Khorasaninejad et al., "Achromatic Metasurface Lens at Telecommunication Wavelengths", Nano Letters, vol. 15, No. 8, Jul. 13, 2015, pp. 5358-5362, doi: 10.1021/acs.nanolett.5b01727.
Khorasaninejad et al., "Broadband and chiral binary dielectric meta-holograms", Science Advances, vol. 2, No. 5, e1501258, May 13, 2016, pp. 1-6, doi: 10.1126/sciadv.1501258.
Khorasaninejad et al., "Broadband Multifunctional Efficient Meta-Gratings Based on Dielectric Waveguide Phase Shifters", Nano Letters, vol. 15, No. 10, Sep. 15, 2015, pp. 6709-6715, doi: 10.1021/acs.nanolett.5b02524.
Khorasaninejad et al., "Metalenses at visible wavelengths: Diffraction-limited focusing and subwavelength resolution imaging", Science, vol. 352, No. 6290, Jun. 3, 2016, pp. 1190-1194, doi: 10.1126/science.aaf6644.
Khorasaninejad et al., "Multispectral Chiral Imaging with a Metalens", Nano Letters, vol. 16, No. 7, Jun. 7, 2016, pp. 4595-4600, doi: 10.1021/acs.nanolett.6b01897.
Khorasaninejad et al., "Planar Lenses at Visible Wavelengths", arXiv:1605.02248v1, May 7, 2016, 17 pgs.

(56) References Cited

OTHER PUBLICATIONS

Khorasaninejad et al., “Polarization-Insensitive Metalenses at Visible Wavelengths”, Nano Letters, vol. 16, No. 11, Oct. 24, 2016, pp. 7229-7234, doi: 10.1021/acs.nanolett.6b03626.
Khorasaninejad et al., “Silicon nanofin grating as a miniature chirality-distinguishing beam-splitter”, Nature Communications, vol. 5, No. 5386, Nov. 12, 2014, 6 pgs., doi: 10.1038/ncomms6386.
Khorasaninejad et al., “Super-Dispersive Off-Axis Meta-Lenses for Compact High Resolution Spectroscopy”, Nano Letters, vol. 16, No. 6, Apr. 27, 2016, pp. 3732-3737, doi: 10.1021/acs.nanolett.6b01097.
Khorasaninejad et al., “Visible Wavelength Planar Metalenses Based on Titanium Dioxide”, IEEE Journal of Selected Topics in Quantum Electronics, vol. 23, No. 3, Article 4700216, May/Jun. 2017, pp. 43-58, doi: 10.1109/JSTQE.2016.2616447.
Kildishev et al., “Planar Photonics with Metasurfaces”, Science, vol. 339, No. 6125, Mar. 15, 2013, pp. 1232009-1-1232009-6, doi: 10.1126.science.1232009.
Kokkoris et al., “Nanoscale Roughness Effects at the Interface of Lithography and Plasma Etching: Modeling of Line-Edge-Roughness Transfer During Plasma Etching”, IEEE Transactions on Plasma Science, vol. 37, No. 9, Sep. 2009, pp. 1705-1714, doi: 10.1109/TPS.2009.2024117.
Kominami et al., “Dipole and Slot Elements and Arrays on Semi-Infinite Substrates”, IEEE Transactions on Antennas and Propagation, vol. AP33, No. 6, Jun. 1985, pp. 600-607, doi: 10.1109/TAP.1985.1143638.
Krasnok et al., “All-dielectric optical nanoantennas”, Optics Express, vol. 20, No. 18, Aug. 27, 2012, pp. 20599-20604, doi: 10.1063/1.4750083.
Kress et al., “Applied Digital Optics from Micro-Optics to Nanophotonics”, Applied Digital Optics, Wiley, 2009, 24 pgs.
Lalanne et al., “Interaction between optical nano-objects at metallo-dielectric interfaces”, Nature Physics, vol. 2, Aug. 2006, pp. 551-556, doi: 10.1038/nphys364.
Lee et al., “Giant nonlinear response from plasmonic metasurfaces coupled to intersubband transitions”, Nature, vol. 511, Jul. 3, 2014, pp. 65-69, doi: 10.1038/nature13455.
Leveque et al., “Transient behavior of surface plasmon polaritons scattered at a subwavelength groove”, Physical Reviews B, vol. 76, No. 155418, Oct. 18, 2007, pp. 155418-1-155418-8, doi: 10.1103/PhysRevB.76.155418.
Lezec et al., “Beaming Light from a Subwavelength Aperture”, Science, vol. 297, No. 5582, Aug. 2, 2002, pp. 820-822, doi: 10.1126/science.1071895.
Li et al., “Achromatic flat optical components via compensation between structure and material dispersions”, Scientific Reports, vol. 6, No. 19885, Jan. 22, 2016, pp. 1-7, doi: 10.1038/srep19885.
Li et al., “All-silicon nanorod-based Dammann gratings”, Optics Letters, vol. 40, No. 18, Sep. 15, 2015, pp. 4285-4288, doi: 10.1364/OL.40.004285.
Li et al., “Broadband diodelike asymmetric transmission of linearly polarized light in ultrathin hybrid metamaterial”, Applied Physics Letters, vol. 105, No. 20, Nov. 19, 2014, pp. 201103-1-201103-5, doi: 10.1063/1.4902162.
Li et al., “Dispersion controlling meta-lens at visible frequency”, Optics Express, vol. 25, No. 18, Sep. 4, 2017, pp. 21419-21427, doi: 10.1364/OE.25.021419.
Li et al., “Flat metasurfaces to focus electromagnetic waves in reflection geometry”, Optics Letters, vol. 37, No. 23, Dec. 1, 2012, pp. 4940-4942, doi: 10.1364/OL.37.004940.
Li et al., “Metalens-Based Miniaturized Optical Systems”, Micromachines, vol. 10, No. 310, May 8, 2019, pp. 1-21, doi: 10.3390/mi10050310.
Lim et al., “Self-mixing imaging sensor using a monolithic VCSEL array with parallel readout”, Optics Express, vol. 17, No. 7, Mar. 30, 2009, pp. 5517-5525, doi: 10.1364/oe.17.005517.
Lin et al., “Dielectric gradient metasurface optical elements”, Science, vol. 345, No. 6194, Jul. 18, 2014, pp. 298-302, doi: 10.1126/science.1253213.
Liu et al., “Realization of polarization evolution on higher-order Poincaré sphere with metasurface”, Applied Physics Letters, vol. 104, No. 19, 2014, pp. 191110-1-191101-4, doi: 10.1063/1.4878409.
Liu et al., “Single-pixel computational ghost imaging with helicity-dependent metasurface hologram”, Science Advances, vol. 3, No. 9, Article e1701477, Sep. 8, 2017, pp. 1-6, doi: 10.1126/sciadv.1701477.
Liu et al., “SSD: Single Shot Multibox Detector”, European Conference on Computer Vision, Springer, 2016, pp. 21-37, doi: 10.1007/978-3-319-46448-0_2.
Lizana et al., “Arbitrary state of polarization with customized degree of polarization generator”, Optics Letters, vol. 40, No. 16, Aug. 15, 2015, pp. 3790-3793, doi: 10.1364/OL.40.003790.
Lo et al., “New architecture for space telescopes uses Fresnel lenses”, SPIE Newsroom, Aug. 9, 2006, 2 pgs., doi: 10.1117/2.1200608.0333.
Lohmann, “Reconstruction of Vectorial Wavefronts”, Applied Optics, vol. 4, No. 12, Dec. 1965, pp. 1667-1668, doi: 10.1364/AO.4.001667.
Lu et al., “Homogeneous and inhomogeneous Jones matrices”, Journal of the Optical Society of America A, vol. 11, No. 2, Feb. 1994, pp. 766-773, doi: 10.1364/JOSAA.11.000766.
Lu et al., “Interpretation of Mueller matrices based on polar decomposition”, Journal of the Optical Society of America A, vol. 13, No. 5, May 1996, pp. 1106-1113, doi: 10.1364/JOSAA.13.001106.
Lu et al., “Planar high-numerical-aperture low-loss focusing reflectors and lenses using subwavelength high contrast gratings”, Optics Express, vol. 18, No. 12, Jun. 7, 2010, pp. 12606-12614, doi: 10.1364/OE.18.012606.
Luk et al., “Dielectric Resonator Antennas”, Research Studies Press Ltd., Hertfordshire, 2003, 404 pgs. (presented in 2 parts).
Ma et al., “Freeform optics construction with nonuniformly sampled grids in modified double-pole coordinate system”, Optical Engineering, vol. 54, No. 12, Dec. 2015, pp. 125102-1-125102-8, doi: 10.1117/1.OE.54.12.125102.
Mackus et al., “The use of atomic layer deposition in advanced nanopatterning”, Nanoscale, vol. 6, 2014, pp. 10941-10960, doi: 10.1039/C4NR01954G.
Maguid et al., “Multifunctional interleaved geometric-phase dielectric metasurfaces”, Light: Science & Applications, vol. 6, No. e17027, Feb. 24, 2017, pp. 1-7, doi: 10.1038/lsa.2017.27.
Maguid et al., “Photonic spin-controlled multifunctional shared-aperture antenna array”, Science, vol. 352, No. 6290, Apr. 21, 2016, pp. 1202-1206, doi: 10.1126/science.aaf3417.
Mao et al., “Nanopatterning using a simple bi-layer lift-off process for the fabrication of a photonic crystal nanostructure”, Nanotechnology, vol. 24, No. 8, Article 085302, Feb. 1, 2013, pp. 1-6, doi: 10.1088/0957-4484/24/8/085302.
Mao et al., “Surface patterning of nonscattering phosphors for light extraction”, Optics Letters, vol. 38, No. 15, Aug. 1, 2013, pp. 2796-2799, doi: 10.1364/OL.38.002796.
Martin-Moreno et al., “Theory of Highly Directional Emission from a Single Subwavelength Aperture Surrounded by Surface Corrugations”, Physical Review Letters, vol. 90, No. 16, Apr. 25, 2003, pp. 167401-1-167401-4, doi: 10.1103/PnysRevLett.9.167401.
Martin-Regalado et al., “Polarization Properties of Vertical-Cavity Surface-Emitting Lasers”, IEEE Journal of Quantum Electronics, vol. 33, No. 5, May 1997, pp. 765-783, doi: 10.1109/3.572151.
Mcleod, “Thin-Film Optical Filters”, Third Edition, Institute of Physics Publishing, Adam Hilger, 1986, 667 pgs. (presented in 2 parts).
Meng et al., “A Novel Nanofabrication Technique of Silicon-Based Nanostructures”, Nanoscale Research Letters, vol. 11, Article 504, Nov. 15, 2016, pp. 1-9, doi: 10.1186/s11671-016-1702-4.
Menzel et al., “Advanced Jones calculus for the classification of periodic metamaterials”, Physical Review A, vol. 82, No. 053811, Nov. 15, 2010, pp. 053811-1-053811-9, doi: 10.1103/PhysRevA.82.053811.
Mirsalehi, “Optical Information Processing”, Encyclopedia of Physical Science and Technology, 3rd edition, 2001, pp. 335-340.

(56) References Cited

OTHER PUBLICATIONS

Miyazaki et al., "Ultraviolet-nanoimprinted packaged metasurface thermal emitters for infrared CO2 sensing", Science and Technology of Advanced Materials, vol. 16, No. 3, Article 035005, May 20, 2015, pp. 1-5, doi: 10.1088/1468-6996/16/3/035005.
Monticone et al., "Full Control of Nanoscale Optical Transmission with a Composite Metascreen", Physical Review Letters, vol. 110, No. 203903, May 17, 2013, pp. 203903-1-203903-5, doi: 10.1103/PhysRevLett. 110.203903.
Moreno et al., "Jones matrix treatment for optical Fourier processors with structured polarization", Optics Express, vol. 19, No. 5, Feb. 28, 2011, pp. 4583-4594, XP055953438, doi: 10.1364/OE.19.004583.
Moreno et al., "Jones matrix treatment for polarization Fourier optics", Journal of Modern Optics, vol. 51, No. 14, Sep. 20, 2004, pp. 2031-2038, doi: 10.1080/09500340408232511.
Mueller et al., "Metasurface Polarization Optics: Independent Phase Control of Arbitrary Orthogonal States of Polarization", Physical Review Letters, vol. 118, No. 11, Mar. 14, 2017, pp. 113901-1-113901-5, doi: 10.1103/PhysRevLett.118.113901.
Mueller et al., "Ultracompact metasurface in-line polarimeter", Optica, vol. 3, No. 1, Jan. 8, 2016, pp. 42-47, doi: 10.1364/OPTICA.3.000042.
Ni et al., "Broadband Light Bending with Plasmonic Nanoantennas", Sciencexpress, vol. 335, No. 6067, Dec. 22, 2011, p. 427, doi: 10.1126/science.1214686.
Ni et al., "Ultra-thin, planar, Babinet-inverted plasmonic metalenses", Light: Science & Applications, vol. 2, No. e72, Apr. 26, 2013, pp. 1-6, doi: 10.1038/lsa.2013.28.
Nikolova et al., "Polarization Holography", Bulgarian Academy of Sciences, Sofia, P. S. Ramanujam, Technical University of Denmark, Roskilde Cambridge University, Aug. 2009, 266 pgs.
Nordin et al., "Micropolarizer array for infrared imaging polarimetry", Journal of the Optical Society of America A, vol. 16, No. 5, May 1999, pp. 1168-1174, doi: 10.1364/JOSAA.16.001168.
Novikova et al., "Polarimetric Imaging for Cancer Diagnosis and Staging", Optics and Photonics News, vol. 23, No. 10, Oct. 2012, pp. 26-33, doi: 10.1364/OPN.23.10.000026.
Oh et al., "Achromatic diffraction from polarization gratings with high efficiency", Optic Letters, vol. 33, No. 20, Oct. 15, 2008, pp. 2287-2289, doi: 10.1364/ol.33.002287.
Okaya et al., "The Dielectric Microwave Resonator", Proceedings of the IRE, vol. 50, No. 10, Oct. 1962, pp. 2081-2092, doi: 10.1109/JRPROC.1962.288245.
Orazbayev et al., "Tunable beam steering enabled by graphene metamaterials", Optics Express, vol. 24, No. 8, Apr. 18, 2016, pp. 8848-8861, doi: 10.1364/OE.24.008848.
Otten et al., "Vector Apodizing Phase Plate coronagraph: prototyping, characterization and outlook", Proceedings of SPIE, Advances in Optical and Mechanical Technologies for Telescopes and Instrumentation, vol. 9151, Sep. 26, 2014, pp. 91511R-1-91511R-10, doi: 10.1117/12.2056096.
Pacheco-Peña et al., "Epsilon-near-zero metalenses operating in the visible", Optics & Laser Technology, vol. 80, Jun. 2016, pp. 162-168, doi: 10.1016/j.optlastec.2016.01.009.
Peinado et al., "Optimization and performance criteria of a Stokes polarimeter based on two variable retarders", Optics Express, vol. 18, No. 10, May 10, 2010, pp. 9815-9830, doi: 10.1364/OE.18.009815.
Petosa, "An Overview of Tuning Techniques for Frequency-Agile Antennas", IEEE Antennas and Propagation Magazine, vol. 54, No. 5, Oct. 2012, pp. 271-296, doi: 10.1109/MAP.2012.6348178.
Pfeiffer et al., "Cascaded metasurfaces for complete phase and polarization control", Applied Physics Letters, vol. 102, No. 23, Jun. 10, 2013, pp. 231116-1-231116-4, doi: 10.1063/1.4810873.
Pfeiffer et al., "Metamaterial Huygens' Surface: Tailoring Wave Fronts with Reflectionless Sheets", Physical Review Letters, vol. 110, No. 197401, May 10, 2013, pp. 197401-1-197401-5, doi: 10.1103/PhysRevLett.110.197401.
Pierangelo et al., "Polarimetric imaging of uterine cervix: a case study", Optics Express, vol. 21, No. 12, Jun. 17, 2013, pp. 14120-14130, doi: 10.1364/OE.21.014120.
International Preliminary Report on Patentability for International Application No. PCT/US2020/028157, Report issued Sep. 28, 2021, Mailed Oct. 28, 2021, 7 pgs.
International Preliminary Report on Patentability for International Application No. PCT/US2020/028159, Report issued Sep. 28, 2021, Mailed on Oct. 28, 2021, 7 pgs.
International Preliminary Report on Patentability for International Application No. PCT/US2020/043600, Report issued Feb. 1, 2022, Mailed on Feb. 10, 2022, 9 pgs.
International Preliminary Report on Patentability for International Application No. PCT/US2022/070043, Report issued Jul. 4, 2023, Mailed on Jul. 20, 2023, 10 pgs.
International Preliminary Report on Patentability for International Application No. PCT/US2024/017903, Report issued Aug. 28, 2025, Mailed Sep. 11, 2025, 5 pgs.
International Search Report and Written Opinion for International Application No. PCT/US2008/084068, Search completed Jan. 13, 2009, Mailed Feb. 2, 2009, 6 pgs.
International Search Report and Written Opinion for International Application No. PCT/US2012/053434, Search completed Oct. 17, 2012, Mailed Dec. 17, 2012, 7 pgs.
International Search Report and Written Opinion for International Application No. PCT/US2015/064930, Search completed Sep. 9, 2016, Mailed Sep. 20, 2016, 11 pgs.
International Search Report and Written Opinion for International Application No. PCT/US2016/052685, Search completed Nov. 30, 2016, Mailed Dec. 9, 2016, 12 pgs.
International Search Report and Written Opinion for International Application No. PCT/US2016/063617, Search completed Jan. 19, 2017, Mailed Mar. 31, 2017, 9 pgs.
International Search Report and Written Opinion for International Application No. PCT/US2017/026206, Search completed Jun. 10, 2017, Mailed Jun. 28, 2017, 15 pgs.
International Search Report and Written Opinion for International Application No. PCT/US2017/036897, Search completed Jan. 31, 2018, Mailed Feb. 21, 2018, 9 pgs.
International Search Report and Written Opinion for International Application No. PCT/US2017/048469, Search completed Apr. 20, 2018, Mailed May 4, 2018, 9 pgs.
International Search Report and Written Opinion for International Application No. PCT/US2018/031204, Search completed Jun. 29, 2018, Mailed Jul. 23, 2018, 14 pgs.
International Search Report and Written Opinion for International Application No. PCT/US2018/034460, Search completed Jul. 29, 2018, Mailed Aug. 24, 2018, 10 pgs.
International Search Report and Written Opinion for International Application No. PCT/US2018/035502, Search completed Jul. 31, 2018, Mailed Aug. 24, 2018, 13 pgs.
International Search Report and Written Opinion for International Application No. PCT/US2018/038357, Search completed Apr. 9, 2019, Mailed May 13, 2019, 12 pgs.
International Search Report and Written Opinion for International Application No. PCT/US2018/046947, Search completed Oct. 14, 2019, Mailed Oct. 25, 2019, 10 pgs.
International Search Report and Written Opinion for International Application No. PCT/US2018/049276, Search completed Oct. 26, 2018, Mailed Jan. 15, 2019, 12 pgs.
International Search Report and Written Opinion for International Application No. PCT/US2019/014975, Search completed Jun. 17, 2019, Mailed Jul. 8, 2019, 10 pgs.
International Search Report and Written Opinion for International Application No. PCT/US2019/018615, Search completed Apr. 12, 2019, Mailed May 6, 2019, 12 pgs.
International Search Report and Written Opinion for International Application No. PCT/US2019/040302, Search completed Aug. 29, 2019, Mailed Oct. 17, 2019, 6 pgs.
International Search Report and Written Opinion for International Application No. PCT/US2020/028157, Search completed Jun. 16, 2020, Mailed Sep. 4, 2020, 9 pgs.

(56) References Cited

OTHER PUBLICATIONS

International Search Report and Written Opinion for International Application No. PCT/US2020/028159, Search completed Jun. 15, 2020, Mailed Aug. 11, 2020, 7 pgs.
International Search Report and Written Opinion for International Application No. PCT/US2020/043600, Search completed Sep. 29, 2020, Mailed Nov. 24, 2020, 11 pgs.
International Search Report and Written Opinion for International Application No. PCT/US2021/031423, Search completed Jul. 15, 2021, Mailed Aug. 16, 2021, 7 pgs.
International Search Report and Written Opinion for International Application No. PCT/US2021/065231, Search completed Apr. 19, 2022, Mailed May 13, 2022, 14 pgs.
International Search Report and Written Opinion for International Application No. PCT/US2022/038059, Search completed Sep. 27, 2022, Mailed Oct. 27, 2022, 17 pgs.
International Search Report and Written Opinion for International Application No. PCT/US2022/070043, Search completed May 5, 2022, Mailed Jun. 9, 2022, 16 pgs.
International Search Report and Written Opinion for International Application No. PCT/US2022/081868, Search completed Mar. 23, 2023, Mailed Apr. 4, 2023, 13 pgs.
International Search Report and Written Opinion received for International Application No. PCT/US2024/017903, Search completed May 3, 2024, Mailed May 16, 2024, 10 pgs.
Partial European Search Report for European Application No. 19744012.6, Search completed Sep. 3, 2021, Mailed Sep. 15, 2021, 12 pgs.
Search Report and Written Opinion for Singapore Patent Application No. SG11201808772W, Search completed Jan. 20, 2020, Mailed Jan. 28, 2020, 12 pgs.
Supplementary Partial European Search Report for European Application No. 16869282.0, Search completed Jun. 19, 2019, Mailed Jul. 2, 2019, 12 pgs.
"Elliptical Polarization", Wikipedia, XP055893535, Jan. 11, 2022, retrieved from the Internet URL: <https://en.wikipedia.org/wiki/Elliptical_polarization>, retrieved on Feb. 18, 2022, 4 pgs.
"Materials for High and Low Refractive Index Coatings", Sigma-Aldrich Inc., Retrieved from the Internet URL: <www.sigmaaldrich.com/materials-science/organic-electronics/ri-coatings.html>, 2019, 3 pgs.
"These Tiny, Incredible 'Metalenses' are the Next Giant Leap in Optics", PetaPixel, retrieved from the Internet URL: <https://petapixel.com/2016/06/03/incredible-flat-metalenses-may-future-optics/>, Jun. 3, 2016, 21 pgs.
Aieta et al., "Aberration-Free Ultrathin Flat Lenses and Axicons at Telecom Wavelengths Based on Plasmonic Metasurfaces", Nano Letters, vol. 12, No. 9, Aug. 15, 2012, pp. 4932-4936, doi: 10.1021/nl302516v.
Aieta et al., "Aberrations of flat lenses and aplanatic metasurfaces", Optics Express, vol. 21, No. 25, Dec. 16, 2013, pp. 31530-31539, doi: 10.1364/OE.21.031530.
Aieta et al., "Multiwavelength achromatic metasurfaces by dispersive phase compensation", Science, vol. 347, No. 6228, Mar. 20, 2015, pp. 1342-1345, doi: 10.1126/science.aaa2494.
Aieta et al., "Out-of-Plane Reflection and Refraction of Light by Anisotropic Optical Antenna Metasurfaces with Phase Discontinuities", Nano Letters, vol. 12, No. 3, Feb. 15, 2012, pp. 1702-1706, doi: 10.1021/nl300204s.
Andreou et al., "Polarization Imaging: Principles and Integrated Polarimeters", IEEE Sensors Journal, vol. 2, No. 6, Dec. 2002, pp. 566-576, doi: 10.1109/JSEN.2003.807946.
Arbabi et al., "Dielectric metasurfaces for complete control of phase and polarization with subwavelength spatial resolution and high transmission", Nature Nanotechnology, vol. 10, Nov. 2015, pp. 937-943, doi: 10.1038/NNANO.2015.186.
Arbabi et al., "Efficient dielectric metasurface collimating lenses for mid-infrared quantum cascade lasers", Optics Express, vol. 23, No. 26, Dec. 28, 2015, pp. 33310-33317, doi: 10.1364/OE.23.033310.
Arbabi et al., "Full-Stokes Imaging Polarimetry Using Dielectric Metasurfaces", ACS Photonics, vol. 5, No. 8, Jul. 16, 2018, pp. 3132-3140, doi: 10.1021/acsphotonics.8b00362.
Arbabi et al., "Miniature optical planar camera based on a wide-angle metasurface doublet corrected for monochromatic aberrations", Nature Communications, vol. 7, No. 13682, Nov. 28, 2016, 9 pgs., doi: 10.1038/ncomms13682.
Arbabi et al., "Subwavelength-thick lenses with high numerical apertures and large efficiency based on high-contrast transmitarrays", Nature Communications, vol. 6, No. 7069, May 7, 2015, pp. 1-6, doi: 10.1038/ncomms8069.
Arbabi et al., "Supplementary Figures of Miniature Optical Planar Camera Based on a Wide-Angle Metasurface Doublet Corrected for Monochromatic Aberrations", Nature Communications, vol. 7, No. 13682, Nov. 28, 2016, 9 pgs., doi: 10.1038/ncomms13682.
Arbabi et al., "Vectorial Holograms with a Dielectric Metasurface: Ultimate Polarization Pattern Generation", ACS Photonics, vol. 6, No. 11, Sep. 18, 2019, pp. 2712-2718, doi: 10.1021/acsphotonics.9b00678.
Arrizon et al., "Pixelated phase computer holograms for the accurate encoding of scalar complex fields", Journal of the Optical Society of America A, vol. 24, No. 11, Nov. 2007, pp. 3500-3507, doi: 10.1364/JOSAA.24.003500.
Azadegan et al., "A Novel Approach for Miniaturization of Slot Antennas", IEEE Transactions on Antennas and Propagation, vol. 51, No. 3, Mar. 2003, pp. 421-429, doi: 10.1109/TAP.2003.809853.
Azzam, "Arrangement of four photodetectors for measuring the state of polarization of light", Optics Letters, vol. 10, No. 7, Jul. 1985, pp. 309-311, doi: 10.1364/OL.10.000309.
Azzam, "Division-of-amplitude photopolarimeter (DOAP) for the simultaneous measurement of all four Stokes parameters of light", Optica Acta, vol. 29, No. 5, 1982, pp. 685-689, doi: 10.1080/713820903.
Azzam, "Stokes-vector and Mueller-matrix polarimetry [Invited]", Journal of the Optical Society of America A, vol. 33, No. 7, Jul. 2016, pp. 1396-1408, doi: 10.1364/JOSAA.33.001396.
Azzam et al., "Accurate calibration of the four-detector photopolarimeter with imperfect polarizing optical elements", Journal of the Optical Society of America A, vol. 6, No. 10, Oct. 1989, pp. 1513-1521, doi: 10.1364/JOSAA.6.001513.
Azzam et al., "Photopolarimeter based on planar grating diffraction", Journal of the Optical Society of America A, vol. 10, No. 6, Jun. 1993, pp. 1190-1196, doi: 10.1364/JOSAA.10.001190.
Bao et al., "Toward the capacity limit of 2D planar Jones matrix with a single-layer metasurface", Science Advances, vol. 7, No. 25, Jun. 18, 2021, pp. 1-6, doi: 10.1126/sciadv.abh0365.
Berry et al., "Measurement of the Stokes parameters of Light", Applied Optics, vol. 16, No. 12, Dec. 1977, pp. 3200-3205, doi: 10.1364/AO.16.003200.
Birch et al., "3D Imaging with Structured Illumination for Advanced Security Applications", Sandia Report, Sep. 2015, Retrieved from the internet: URL: <https://www.osti.gov/biblio/1221516>, 64 pgs., doi: 10.2172/1221516.
Blanchard et al., "Modeling nanoscale V-shaped antennas for the design of optical phased arrays", Physical Review B, vol. 85, No. 155457, Apr. 30, 2012, pp. 155457-1-155457-11, doi: 10.1103/physRevB.85.155457.
Bomzon et al., "Real-time analysis of partially polarized light with a space-variant subwavelength dielectric grating", Optics Letters, vol. 27, No. 3, Feb. 1, 2002, pp. 188-190, doi: 10.1364/OL.27.000188.
Bomzon et al., "Spatial Fourier-transform polarimetry using space-variant subwavelength metal-stripe polarizers", Optics Letters, vol. 26, No. 21, Nov. 1, 2001, pp. 1711-1713, doi: 10.1364/OL.26.001711.
Buralli et al., "Optical performance of holographic kinoforms", Applied Optics, vol. 28, No. 5, Mar. 1, 1989, pp. 976-983, doi: 10.1364/AO.28.000976.
Byrnes et al., "Designing large, high-efficiency, high-numerical-aperture, transmissive meta-lenses for visible light", Optics Express, vol. 24, No. 5, Mar. 7, 2016, pp. 5110-5124, doi: 10.1364/OE.24.005110.

(56) References Cited

OTHER PUBLICATIONS

Campione et al., "Tailoring dielectric resonator geometries for directional scattering and Huygens' metasurfaces", Optics Express, vol. 23, No. 3, Feb. 9, 2015, pp. 2293-2307, doi: 10.1364/OE.23.002293.
Capaldo et al., "Nano-fabrication and characterization of silicon meta-surfaces provided with Pancharatnam-Berry effect", Optical Materials Express, vol. 9, No. 3, Mar. 1, 2019, pp. 1015-1032, doi: 10.1364/OME.9.001015.
Chen et al., "A broadband achromatic metalens for focusing and imaging in the visible", Nature Nanotechnology, vol. 13, Jan. 1, 2018, pp. 220-226, doi: 10.1038/s41565-017-0034-6.
Chen et al., "A review of metasurfaces: physics and applications", Reports on Progress in Physics, vol. 79, No. 7, Jun. 16, 2016, 40 pgs., doi: 10.1088/0034-4885/79/7/076401.
Chen et al., "Broadband Achromatic Metasurface-Refractive Optics", Nano Letters, vol. 18, No. 12, Nov. 13, 2018, pp. 7801-7808, doi: 10.1021/acs.nanolett.8b03567.
Chen et al., "Dual-polarity plasmonic metalens for visible light", Nature Communications, vol. 3, No. 1198, Nov. 13, 2012, pp. 1-6, doi: 10.10388/ncomms2207.
Chen et al., "Engineering the Phase Front of Light with Phase-Change Material Based Planar Lenses", Scientific Reports, vol. 5, No. 8660, Mar. 2, 2015, 7 pgs., doi: 10.1038/srep08660.
Chen et al., "High-Efficiency Broadband Meta-Hologram with Polarization-Controlled Dual Images", Nano Letters, vol. 14, No. 1, Dec. 13, 2013, pp. 225-230, doi: 10.1021/nl403811d.
Chen et al., "Immersion Meta-Lenses at Visible Wavelengths for Nanoscale Imaging", Nano Letters, vol. 17, No. 5, Apr. 7, 2017, pp. 3188-3194, doi: 10.1021/acs.nanolett.7b00717.
Chen et al., "Integrated plasmonic metasurfaces for spectropolarimetry", Nanotechnology, vol. 27, No. 22, Apr. 26, 2016, 7 pgs., doi: 10.1088/0957-4484/27/22/224002.
Chen et al., "Phase and dispersion engineering of metalenses: broadband achromatic focusing and imaging in the visible", arXiv:1711.09343, Nov. 26, 2017, 30 pgs.
Chen et al., "Supplementary Information of Engineering the Phase Front of Light with Phase-Change Material Based Planar Lenses", Scientific Reports, vol. 5, No. 8660, 2015, 4 pgs.
Chipman et al., "Polarized Light and Optical Systems", CRC Press, 2019, 106 pgs.
Chou et al., "Imprint Lithography with 25-Nanometer Resolution", Science, vol. 272, No. 5258, Apr. 5, 1996, pp. 85-87, doi: 10.1126/science.272.5258.85.
Chou et al., "Subwavelength amorphous silicon transmission gratings and applications in polarizers and waveplates", Applied Physics Letters, vol. 67, No. 6, Aug. 7, 1995, pp. 742-744, doi: 10.1063/1.115211.
Cincotti, "Polarization Gratings: Design and Applications", IEEE Journal of Quantum Electronics, vol. 39, No. 12, Dec. 2003, pp. 1645-1652, doi: 10.1109/JQE.2003.819526.
Cloude, "Conditions for the physical realisability of matrix operators in polarimetry", Proceedings of SPIE, Polarization Considerations for Optical Systems II, vol. 1166, 1989, pp. 177-185, doi: 10.1117/12.962889.
Cofre et al., "Quantitative performance of a polarization diffraction grating polarimeter encoded onto two liquid-crystal-on-silicon displays", Optics & Laser Technology, vol. 96, Nov. 2017, pp. 219-226, doi: 10.1016/j.optlastec.2017.05.027.
Cui et al., "Sixteen-beam grating-based division-of-amplitude photopolarimeter", Optics Letters, vol. 21, No. 1, Jan. 1, 1996, pp. 89-91, doi: 10.1364/OL.21.000089.
Cumme et al., "From regular periodic micro-lens arrays to randomized continuous phase profiles", Advanced Optical Technologies, vol. 4, No. 1, Feb. 6, 2015, pp. 47-61, doi: 10.1515/aot-2014-0062.
Damask, "Polarization Optics in Telecommunications", Optical Sciences, Springer, 2005, 535 pgs. (Presented in 2 Parts).
Davis et al., "Diffraction gratings generating orders with selective states of polarization", Optics Express, vol. 24, No. 2, Jan. 2016, pp. 907-917, doi: 10.1364/OE.24.000907.
Davis et al., "Polarization beam splitters using polarization diffraction gratings", Optics Letters, vol. 26, No. 9, May 1, 2001, pp. 587-589, doi: 10.1364/OL.26.000587.
Dayal et al., "Polarization control of 0.85 μm vertical-cavity surface-emitting lasers integrated with gold nanorod arrays", Applied Physics Letters, vol. 91, No. 11, Sep. 12, 2007, pp. 111107-1-111107-3, doi: 10.1063/1.2783281.
Decker et al., "High-efficiency light-wave control with all-dielectric optical Huygens' metasurfaces", arXiv:1405.5038v1, May 20, 2014, 17 pgs.
Deng et al., "Diatomic Metasurface for Vectorial Holography", Nano Letters, vol. 18, No. 5, Mar. 28, 2018, pp. 2885-2892, doi: 10.1021/acs.nanolett.8b00047.
Deschapms et al., "The POLDER Mission: Instrument Characteristics and Scientific Objectives", IEEE Transactions on Geoscience and Remote Sensing, vol. 32, No. 3, May 1994, pp. 598-615, doi: 10.1109/36.297978.
Devlin et al., "Arbitrary spin-to-orbital angular momentum conversion of light", Science, vol. 358, No. 6365, Nov. 17, 2017, pp. 896-901, doi: 10.1126/science.aao5392.
Devlin et al., "Broadband high-efficiency dielectric metasurfaces for the visible spectrum", PNAS, vol. 113, No. 38, Sep. 6, 2016, pp. 10473-10478, doi: 10.1073/pnas.1611740113.
Devlin et al., "High efficiency dielectric metasurfaces at visible wavelengths", arXiv:1603.02735v1, Mar. 8, 2016, pp. 1-18.
Ding et al., "Beam-Size-Invariant Spectropolarimeters Using Gap-Plasmon Metasurfaces", ACS Photonics, vol. 4, No. 4, Feb. 28, 2017, pp. 943-949, doi: 10.1021/acsphotonics.6b01046.
Ding et al., "Gradient metasurfaces: fundamentals and applications", arXiv:1704:03032v1, Apr. 10, 2017, 83 pgs.
Ding et al., "Versatile Polarization Generation and Manipulation Using Dielectric Metasurfaces", Laser & Photonics Review, vol. 14, No. 11, Article 2000116, Nov. 2020, pp. 1-7, doi: 10.1002/lpor.202000116.
Pors et al., "Broadband Focusing Flat Mirrors Based on Plasmonic Gradient Metasurfaces", Nano Letters, vol. 13, No. 2, Jan. 23, 2013, pp. 829-834, doi: 10.1021/nl304761m.
Pors et al., "Plasmonic metagratings for simultaneous determination of Stokes parameters", Optica, vol. 2, No. 8, Aug. 2015, pp. 716-723, doi: 10.1364/OPTICA.2.000716.
Pors et al., "Waveguide Metacouplers for In-Plane Polarimetry", Physical Review Applied, vol. 5, No. 064015, Jun. 27, 2016, pp. 064015-1-064015-9, doi: 10.1103/PhysRevApplied.5.064015.
Ramos et al., "Error propagation in polarimetric demodulation", Applied Optics, vol. 47, No. 14, May 10, 2008, pp. 2541-2549, doi: 10.1364/AO.47.002541.
Redding et al., "Full-field interferometric confocal microscopy using a VCSEL array", Optics Letters, vol. 39, No. 15, Aug. 1, 2014, pp. 4446-4449, doi: 10.1364/OL.39.004446.
Reichelt et al., "Capabilities of diffractive optical elements for real-time holographic displays", Proceedings of SPIE, Practical Holography XXII: Materials and Applications, vol. 6912, Feb. 2008, pp. 69120-69130, doi: 10.1117/12.762887.
Romero et al., "Theory of optimal beam splitting by phase gratings. II. Square and hexagonal gratings", Journal of the Optical Society of America A, vol. 24, No. 8, Aug. 2007, pp. 2296-2312, doi: 10.1364/JOSAA.24.002296.
Rosales-Guzman et al., "How to Shape Light with Spatial Light Modulators", SPIE, 2017, 58 pgs.
Roy et al., "Sub-wavelength focusing meta-lens", Optics Express, vol. 21, No. 6, Mar. 25, 2013, pp. 7577-7582, doi: 10.1364/OE.21.007577.
Rubin et al., "Matrix Fourier Optics Enables a Compact Full-Stokes Polarization Camera", Science, vol. 365, No. 6448, Jul. 5, 2019, pp. 1-8, doi: 10.1126/science.aax1839.
Rubin et al., "Polarization state generation and measurement with a single metasurface", Optics Express, vol. 26, No. 17, Aug. 20, 2018, pp. 21455-21478, doi: 10.1364/0E.26.021455.
Sabatke et al., "Optimization of retardance for a complete Stokes polarimeter", Optics Letters, vol. 25, No. 11, Jun. 1, 2000, pp. 802-804, doi: 10.1364/OL.25.000802.

(56) References Cited

OTHER PUBLICATIONS

Saeidi et al., "Wideband plasmonic focusing metasurfaces", Applied Physics Letters, vol. 105, No. 053107, Aug. 2014, pp. 053107-1-053107-4, doi: 10.1063/1.4892560.
Sales et al., "Diffractive-refractive behavior of kinoform lenses", Applied Optics, vol. 36, No. 1, Jan. 1, 1997, pp. 253-257, doi: 10.1364/AO.36.000253.
Sancho-Parramon et al., "Optical characterization of HfO2 by spectroscopic ellipsometry: Dispersion models and direct data inversion", Thin Solid Films, vol. 516, No. 22, Sep. 30, 2008, pp. 7990-7995, doi: 10.1016/j.tsf.2008.04.007.
Sayyah et al., "Two-dimensional pseudo-random optical phased array based on tandem optical injection locking of vertical cavity surface emitting lasers", Optics Express, vol. 23, No. 15, Jul. 27, 2015, pp. 19405-19416, doi: 10.1364/OE.23.019405.
Schulz et al., "Quantifying the impact of proximity error correction on plasmonic metasurfaces", Optical Materials Express, vol. 5, No. 12, Dec. 1, 2015, pp. 2798-2803, doi: 10.1364/OME.5.002798.
Sell et al., "Periodic Dielectric Metasurfaces with High-Efficiency, Multiwavelength Functionalities", Advanced Optical Materials, vol. 5, No. 23, Article 1700645, Dec. 1, 2017, 7 pgs., doi: 10.1002/adom.201700645.
Seurin et al., "High-efficiency VCSEL arrays for illumination and sensing in consumer applications", Proceedings of SPIE, Vertical-Cavity Surface-Emitting Lasers XX, vol. 9766, 2016, pp. 97660D-1-97660D-9, doi: 10.1117/12.2213295.
She et al., "Large area metalenses: design, characterization, and mass manufacturing", Optics Express, vol. 26, No. 2, Jan. 22, 2018, pp. 1573-1585, doi: 10.1364/OE.26.001573.
Shi et al., "Continuous angle-tunable birefringence with freeform metasurfaces for arbitrary polarization conversion", Science Advances, vol. 6, No. 23, eaba3367, Jun. 3, 2020, pp. 1-7, doi: 10.1126/sciadv.aba3367.
Shim et al., "Hard-tip, soft-spring lithography", Nature, vol. 469, Jan. 27, 2011, pp. 516-521, doi: 10.1038/nature09697.
Shurcliff, "Polarized Light: Production and Use", Harvard University Press, Science, 1962, 219 pgs.
Silvestri et al., "Robust design procedure for dielectric resonator metasurface lens array", Optics Express, vol. 24, No. 25, Dec. 12, 2016, pp. 29153-29169, doi: 10.1364/OE.24.029153.
Snik et al., "An Overview of Polarimetric Sensing Techniques and Technology with Applications to Different Research Fields", Proceedings of SPIE, Polarization: Measurement, Analysis, and Remote Sensing XI, vol. 9099, 2014, pp. 90990B-1-90990B-20, doi: 10.1117/12.2053245.
Sokolov, "Polarization of Spherical Waves", Optics and Spectroscopy, vol. 92, No. 6, Jun. 2002, pp. 936-942, doi: 10.1134/1.1490033.
Song et al., "Vividly-Colored Silicon Metasurface Based on Collective Electric and Magnetic Resonances", 11th Conference on Lasers and Electro-Optics Pacific Rim (CLEO-PR), 2015, 2 pgs., doi: 10.1109/CLEOPR.2015.7375849.
Sreelal et al., "Jones matrix microscopy from a single-shot intensity measurement", Optics Letters, vol. 42, No. 24, Dec. 15, 2017, pp. 5194-5197, doi: 10.1364/OL.42.005194.
Stenflo, "Chapter 13: Instrumentation for Solar Polarimetry", Solar Magnetic Fields: Polarized Radiation Diagnostics, Springer Netherlands, Dordrecht, 1994, pp. 312-350.
Su et al., "Designing LED array for uniform illumination distribution by simulated annealing algorithm", Optics Express, vol. 20, No. S6, Nov. 5, 2012, pp. A843-A855, doi: 10.1364/OE.20.00a843.
Sun et al., "High-Efficiency Broadband Anomalous Reflection by Gradient Meta-Surfaces", Nano Letters, vol. 12, No. 12, Nov. 28, 2012, pp. 6223-6229, doi: 10.1021/nl3032668.
Tervo et al., "Paraxial-domain diffractive elements with 100% efficiency based on polarization gratings", Optics Letters, vol. 25, No. 11, Jun. 1, 2000, pp. 785-786, doi: 10.1364/OL.25.000785.
Todorov et al., "Polarization holography. 1: A new high-efficiency organic material with reversible photoinduced birefringence", Applied Optics, vol. 23, No. 23, Dec. 1, 1984, pp. 4309-4312, doi: 10.1364/AO.23.004309.
Todorov et al., "Spectrophotopolarimeter: fast simultaneous real-time measurement of light parameters", Optics Letters, vol. 17, No. 5, Mar. 1, 1992, pp. 358-359, doi: 10.1364/OL.17.000358.
Trebino et al., "The Autocorrelation, the Spectrum, and Phase Retrieval", Frequency-Resolved Optical Gating: The Measurement of Ultrashort Laser Pulses, Springer, 2000, pp. 61-99, doi: 10.1007/978-1-4615-1181-6_4.
Tyo, "Noise equalization in Stokes parameter images obtained by use of variable-retardance polarimeters", Optics Letters, vol. 25, No. 16, Aug. 15, 2000, pp. 1198-1200, doi: 10.1364/OL.25.001198.
Tyo et al., "Review of passive imaging polarimetry for remote sensing applications", Applied Optics, vol. 45, No. 22, Aug. 1, 2006, pp. 5453-5469, doi: 10.1364/AO.45.005453.
Vo et al., "Sub-Wavelength Grating Lenses With a Twist", IEEE Photonics Technology Letters, vol. 26, No. 13, Jul. 1, 2014, pp. 1375-1378, doi: 10.1109/LPT.2014.2325947.
Voelkel et al., "Laser Beam Homogenizing: Limitations and Constraints", Proceedings of SPIE, Europe, Optical Systems Design, vol. 7102, 2008, 12 pgs.
Voelz, "Transmittance Functions, Lenses, and Gratings", Chapter 6, Computational Fourier Optics: A Matlab Tutorial, 2011, pp. 89-111, doi: 10.1117/3.858456.ch6.
Walther et al., "Spatial and Spectral Light Shaping with Metamaterials", Advanced Materials, vol. 24, No. 47, Dec. 11, 2012, pp. 6300-6304, doi: 10.1002/adma.201202540.
Wang et al., "Broadband achromatic optical metasurface devices", Nature Communications, vol. 8, No. 187, Aug. 4, 2017, pp. 1-9, doi: 10.1038/s41467-017-00166-7.
Wang et al., "Generation of steep phase anisotropy with zero-backscattering by arrays of coupled dielectric nano-resonators", Applied Physics Letters, vol. 105, No. 121112, Sep. 25, 2014, pp. 121112-1-121112-5, doi: 10.1063/1.4896631.
Wang et al., "Information authentication using an optical dielectric metasurface", Journal of Physics D: Applied Physics, Institute of Physics Publishing, Bristol, vol. 50, No. 36, Aug. 17, 2017, pp. 1-5, doi: 10.1088/1361-6463/aa7c97.
Wei et al., "Design of ultracompact polarimeters based on dielectric metasurfaces", Optics Letters, vol. 42, No. 8, Apr. 15, 2017, pp. 1580-1583, doi: 10.1364/OL.42.001580.
Wen et al., "Metasurface for characterization of the polarization state of light", Optics Express, vol. 23, No. 8, Apr. 20, 2015, pp. 10272-10281, doi: 10.1364/OE.23.010272.
Wiktorowicz et al., "Toward the Detection of Exoplanet Transits with Polarimetry", The Astrophysical Journal, vol. 795, No. 12, Nov. 1, 2014, 6 pgs., doi: 10.1088/0004-637X/795/1/12.
Wolf, "Introduction to the Theory of Coherence and Polarization of Light", Cambridge University Press, 2007, 235 pgs.
Wu et al., "Spectrally selective chiral silicon metasurfaces based on infrared Fano resonances", Nature Communications, vol. 5, No. 3892, 2014, published online May 27, 2014, 9 pgs., doi: 10.1038/ncomms4892.
Xu et al., "Metasurface external cavity laser", Applied Physics Letters, vol. 107, No. 221105, 2015, pp. 221105-1-221105-5, doi: 10.1063/1.4936887.
Xu et al., "Metasurface quantum-cascade laser with electrically switchable polarization", Optica, vol. 4, No. 4, Apr. 2017, pp. 468-475, doi: 10.1364/optica.4.000468.
Yang et al., "Design of ultrathin plasmonic quarter-wave plate based on period coupling", Optics Letters, vol. 38, No. 5, Mar. 1, 2013, pp. 679-681, doi: 10.1364/OL.38.000679.
Yang et al., "Generalized Hartmann-Shack array of dielectric metalens sub-arrays for polarimetric beam profiling", Nature Communications, vol. 9, No. 4607, Nov. 2, 2018, pp. 1-7, doi: 10.1038/s41467-018-07056-6.
Yao et al., "Wide Wavelength Tuning of Optical Antennas on Graphene with Nanosecond Response Time", Nano Letters, vol. 14, No. 1, Dec. 3, 2013, pp. 214-219, doi: 10.1021/nl403751p.

(56) References Cited

OTHER PUBLICATIONS

Yariv et al., "Photonics: Optical Electronics in Modern Communications", 6th edition, Oxford University Press, 2006, 849 pgs. (Presented in 3 Parts).
Yu et al., "A Broadband, Background-Free Quarter-Wave Plate Based on Plasmonic Metasurfaces", Nano Letters, vol. 12, No. 12, Nov. 6, 2012, pp. 6328-6333, doi: 10.1021/nl303445u.
Yu et al., "Flat optics with designer metasurfaces", Nature Materials, vol. 13, Feb. 23, 2014, pp. 139-150, doi: 10.1038/NMAT3839.
Yu et al., "Flat Optics: Controlling Wavefronts With Optical Antenna Metasurfaces", IEEE Journal of Selected Topics, vol. 19, No. 3, May/Jun. 2013, 23 pgs., doi: 10.1109/JSTQE.2013.2241399.
Yu et al., "High-Transmission Dielectric Metasurface with 2TT Phase Control at Visible Wavelengths", Laser & Photonics Reviews, vol. 9, No. 4, Jul. 2015, pp. 412-418, doi: 10.1002/lpor.201500041.
Yu et al., "Light Propagation with Phase Discontinuities: Generalized Laws of Reflection and Refraction", Science, vol. 334, No. 6054, Oct. 21, 2011, pp. 333-337, doi: 10.1126/science.1210713.
Yu et al., "Optical Metasurfaces and Prospect of Their Applications Including Fiber Optics", Journal of Lightwave Technology, vol. 33, No. 12, Jun. 15, 2015, pp. 2344-2358, doi: 10.1109/JLT.2015.2404860.
Yu et al., "Quantum cascade lasers with integrated plasmonic antenna-array collimators", Optics Express, vol. 16, No. 24, Nov. 24, 2008, pp. 19447-19461, doi: 10.1364/OE.16.019447.
Yu et al., "Small divergence edge-emitting semiconductor lasers with two-dimensional plasmonic collimators", Applied Physics Letters, vol. 93, No. 181101, 2008, pp. 181101-1-181101-3, doi: 10.1063/1.3009599.
Yu et al., "Small-divergence semiconductor lasers by plasmonic collimation", Nature Photonics, vol. 2, Sep. 2008, pp. 564-570, doi: 10.1038/nphoton.2008.152.
Yun et al., "Skew aberration: a form of polarization aberration", Optics Letters, vol. 36, No. 20, Oct. 15, 2011, pp. 4062-4064, doi: 10.1364/OL.36.004062.
Zhan et al., "Low-Contrast Dielectric Metasurface Optics", ACS Photonics, vol. 3, No. 2, Feb. 1, 2016, pp. 209-214, doi: 10.1021/acsphotonics.5b00660.
Zhang et al., "High efficiency all-dielectric pixelated metasurface for near-infrared full-Stokes polarization detection", Photonics Research, vol. 9, No. 4, Apr. 2021, pp. 583-589, doi: 10.1364/PRJ.415342.
Zhao et al., "Mie resonance-based dielectric metamaterials", Materials Today, vol. 12, No. 12, Dec. 2009, pp. 60-69, doi: 10.1016/S1369-7021(09)70318-9.
Zhao et al., "Multichannel vectorial holographic display and encryption", Light Science & Applications, vol. 7, No. 95, Nov. 28, 2018, 9 pgs., doi: 10.1038/s41377-018-0091-0.
Zhao et al., "Recent Advances on Optical Metasurfaces", Journal of Optics, vol. 16, No. 12, Nov. 27, 2014, pp. 1-14, doi: 10.1088/2040-8978/16/12/123001.
Zhao et al., "Tailoring the Dispersion of Plasmonic Nanorods to Realize Broadband Optical Meta-Waveplates", Nano Letter, vol. 13, No. 3, Feb. 5, 2013, pp. 1086-1091, doi: 10.1021/nl304392b.
Zhao et al., "Twisted optical metamaterials for planarized ultrathin broadband circular polarizers", Nature Communications, vol. 3, No. 870, May 29, 2012, pp. 1-7, doi: 10.1038/ncomms1877.
Zhou et al., "Characteristic Analysis of Compact Spectrometer Based on Off-Axis Meta-Lens", Applied Sciences, vol. 8, No. 321, 2018, 11 pgs., doi: 10.3390/app8030321.
Zhou et al., "Plasmonic holographic imaging with V-shaped nanoantenna array", Optics Express, vol. 21, No. 4, Feb. 25, 2013, pp. 4348-4354, doi: 10.1364/OE.21.004348.
Zhou et al., "Progress on vertical-cavity surface-emitting laser arrays for infrared illumination applications", Proceedings of SPIE, Vertical-Cavity Surface-Emitting Lasers XVIII, vol. 9001, 90010E, Feb. 27, 2014, 11 pgs., doi: 10.1117/12.2040429.
Zhu et al., "Ultra-compact visible chiral spectrometer with metalenses", APL Photonics, vol. 2, No. 3, Article 036103, Feb. 7, 2017, pp. 036103-1-036103-12, doi: 10.1063/1.4974259.
Zou et al., "Dielectric resonator nanoantennas at visible frequencies", Optics Express, vol. 21, No. 1, Jan. 14, 2013, pp. 1344-1352, doi: 10.1364/OE.21.001344.

* cited by examiner

POLARIZATION-TUNED METASURFACE DEVICE

CROSS-REFERENCE TO RELATED APPLICATIONS

This application claims the benefit of and priority under 35 U.S.C. § 119(e) to U.S. Provisional Patent Application Ser. No. 63/487,766, entitled "Polarization-Tuned Metasurface Device" and filed Mar. 1, 2023, which is incorporated herein by reference in its entirety for all purposes.

FIELD OF THE INVENTION

The present invention generally relates to metasurface devices that are tuned to handle non-collimated light sources.

BACKGROUND

Metasurfaces include a plurality of metasurface elements. Metasurface elements are diffractive optical elements in which individual waveguide elements have subwavelength spacing and have a planar profile. Metasurface elements have recently been developed for application in the UV-IR bands (300-10,000 nm). Compared to traditional refractive optics, metasurface elements may abruptly introduce phase shifts onto light field. This enables metasurface elements to have thicknesses on the order of the wavelength of light at which they are designed to operate, whereas traditional refractive surfaces have thicknesses that are 10-100 times (or more) larger than the wavelength of light at which they are designed to operate. Additionally, metasurface elements may have no variation in thickness in the constituent elements and thus are able to shape light without any curvature, as typically included in refractive optics. Compared to traditional diffractive optical elements (DOEs), for example binary diffractive optics, metasurface elements have the ability to impart a range of phase shifts on an incident light field, at a minimum the metasurface elements can have phase shifts between 0-2$\pi$ with at least 5 distinct values from that range, whereas binary DOEs are only able to impart two distinct values of phase shift and are often limited to phase shifts of either 0 or 1$\pi$. Compared to multi-level DOE's, metasurface elements do not require height variation of its constituent elements along the optical axis, only the in-plane geometries of the metasurface element features vary.

SUMMARY OF THE DISCLOSURE

In some aspects, the techniques described herein relate to a metasurface device including: a metasurface including multiple metasurface elements configured to receive light including at least one of a first polarization or a second polarization with a diverging wavefront from a light source, wherein the first polarization and the second polarization are orthogonal, wherein the metasurface elements include an interior metasurface element which is substantially aligned to an axis and exterior metasurface elements which are rotated with respect to the axis, wherein the exterior metasurface elements positioned farther away from the interior metasurface element are more rotated than the exterior metasurface elements positioned closer to the interior metasurface element, and wherein the metasurface is configured to diffract light with the first polarization into a first output light beam and/or light with the second polarization into a second output light beam.

In some aspects, the techniques described herein relate to a metasurface device, wherein the light source includes a VCSEL array.

In some aspects, the techniques described herein relate to a metasurface device, wherein the VCSEL array includes interlaced vertical polarization VCSELs and horizontal polarization VCSELs which output light with a spherical wavefront.

In some aspects, the techniques described herein relate to a metasurface device, wherein the VCSEL array is configured to switch between light source is configured to output light from the vertical polarization VCSELs or the horizontal polarization VCSELs at distinctly different times.

In some aspects, the techniques described herein relate to a metasurface device, wherein the first output light beam has a different illumination pattern than the second output light beam.

In some aspects, the techniques described herein relate to a metasurface device, wherein the first output light beam has a more dispersed illumination pattern than the second output light beam.

In some aspects, the techniques described herein relate to a metasurface device, wherein the VCSEL array includes interlaced first polarization VCSELs and second polarization VCSELs, and wherein the first polarization VCSELs and second polarization VCSELs output light with opposite polarizations.

In some aspects, the techniques described herein relate to a metasurface device, wherein the first polarization VCSELs and the second polarization VCSELs output circularly polarized light.

In some aspects, the techniques described herein relate to a metasurface device, wherein the first polarization VCSELs and the second polarization VCSELs output elliptically polarized light.

In some aspects, the techniques described herein relate to a metasurface device, wherein the light received by the metasurface has a non-collimated wavefront.

In some aspects, the techniques described herein relate to a metasurface device, wherein the metasurface elements are rectangular with identical length and width.

In some aspects, the techniques described herein relate to a metasurface device, wherein the metasurface elements are rectangular and at least one metasurface element has a different length and/or width than another metasurface element of the metasurface elements.

In some aspects, the techniques described herein relate to a metasurface device, wherein the metasurface elements are elliptical.

In some aspects, the techniques described herein relate to a metasurface device, wherein the metasurface elements are arranged in a rectangular grid.

In some aspects, the techniques described herein relate to a metasurface device, wherein the metasurface elements are arranged in a hexagonal grid.

In some aspects, the techniques described herein relate to a metasurface device, wherein the rotation, of the metasurface elements at specific positions are defined by the following equation: where, where, and where is the distance of the metasurface plane from the source emitting with spherical wavefront placed at.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Disclosed herein is optical devices and methods including polarization-tuned metasurface optics. The polarization-tuned metasurface optics may include geometrical birefringence introduced intentionally by breaking the rotational symmetry of constituent metasurface elements or pillars. Certain embodiments include a design principle and corresponding adjustments to the layout of a metasurface design to ensure minimal cross-talk under illumination by two orthogonal polarizations with a non-collimated light source such as a light source including one or more divergent wavefronts. For example, the non-collimated light source may have a non-collimated and/or a spherical wavefront. The spherical wavefront may induce a local “polarization skew aberration” with respect to the metasurface plane, which may be adjusted for in the design process by rotating the metasurface elements into alignment with the local spherical coordinate system. The metasurface elements may have geometric birefringence.

Figure 1:
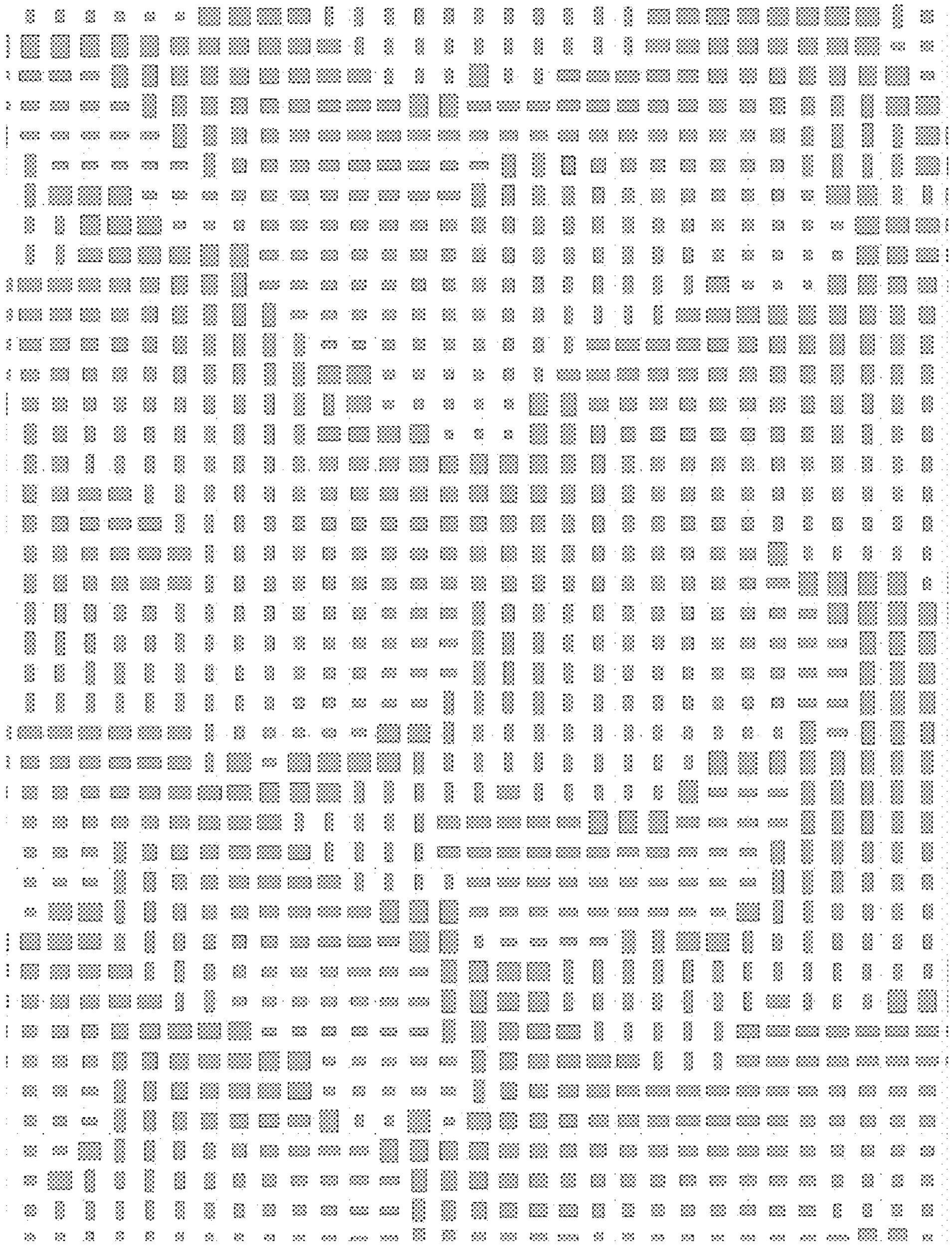
FIG. 1 illustrates an example metasurface device for orthogonal polarizations without tuning.

FIG. 1 illustrates an example metasurface device for orthogonal polarizations without tuning. The metasurface device may be utilized for polarization-switchable illumination of a scene through projection of each polarization state or channel to a distinct illumination pattern. The metasurface device may be designed for two orthogonal polarization states. FIG. 1 is a magnified view of the microscopic structure of the metasurface device including multiple metasurface elements having rectangular cross-sections. Alternate embodiments may include metasurface elements having an elongated or oval cross-sections, or other non-symmetrical cross-sections. In this configuration, the base metasurface library is targeting two orthogonal linear polarization states, though in general the orthogonal polarization states need not be linear. For a collimated beam, this design with a manhattan grid without rotation of the metasurface elements may be utilized. However, because the metasurface unit cell is aligned to the polarization axes, for incident illumination of a non-collimated or curved (e.g. spherical) wavefront, the outgoing radiation polarization may not be perfectly aligned to the eigen-polarization states of the unit cell at a given location and cross-talk may result, lowering the efficiency of the output and/or producing overlapping output patterns.

Figure 2A:
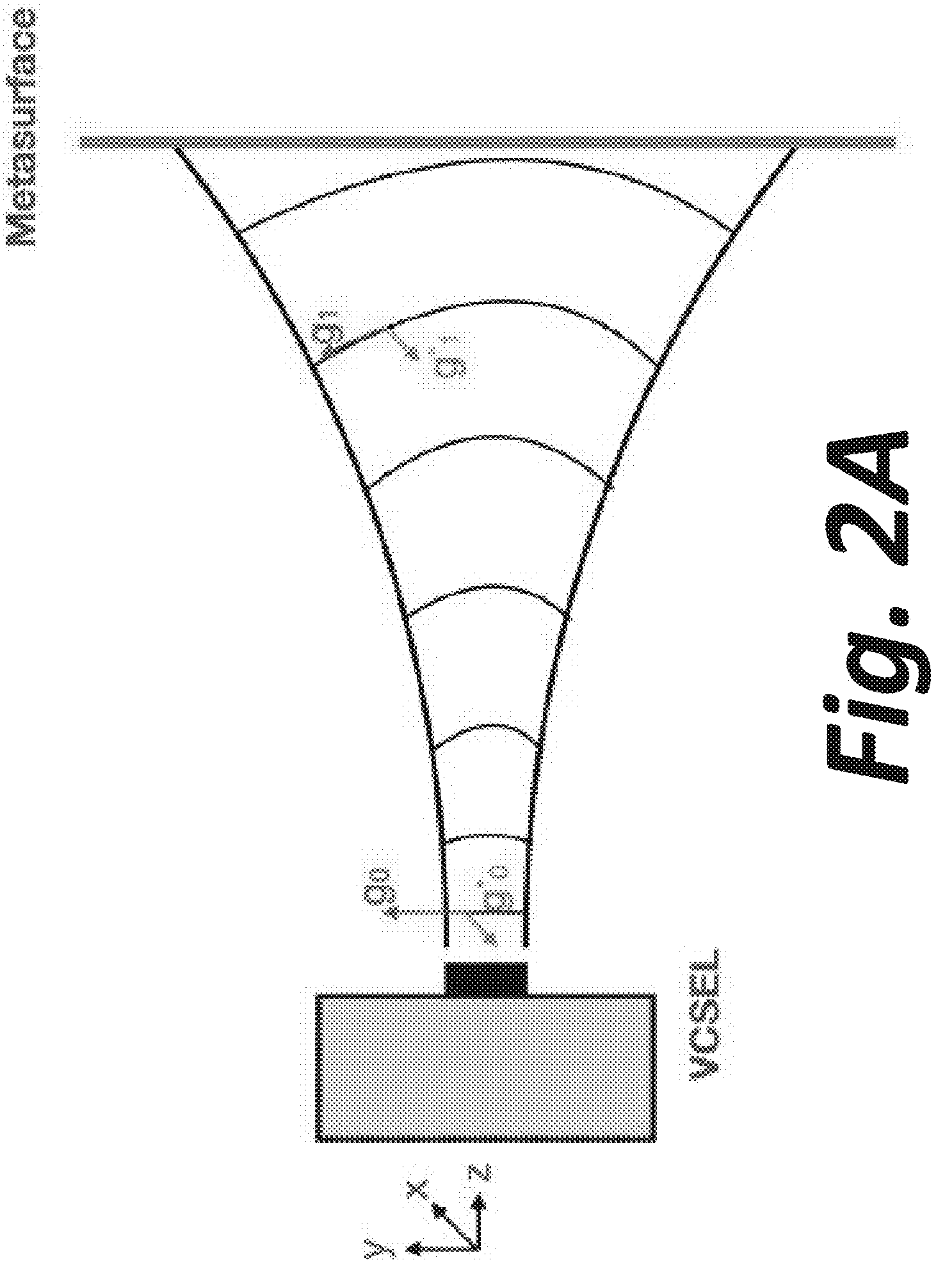
FIG. 2A illustrates an example output from a VCSEL light source.
Figure 2B:
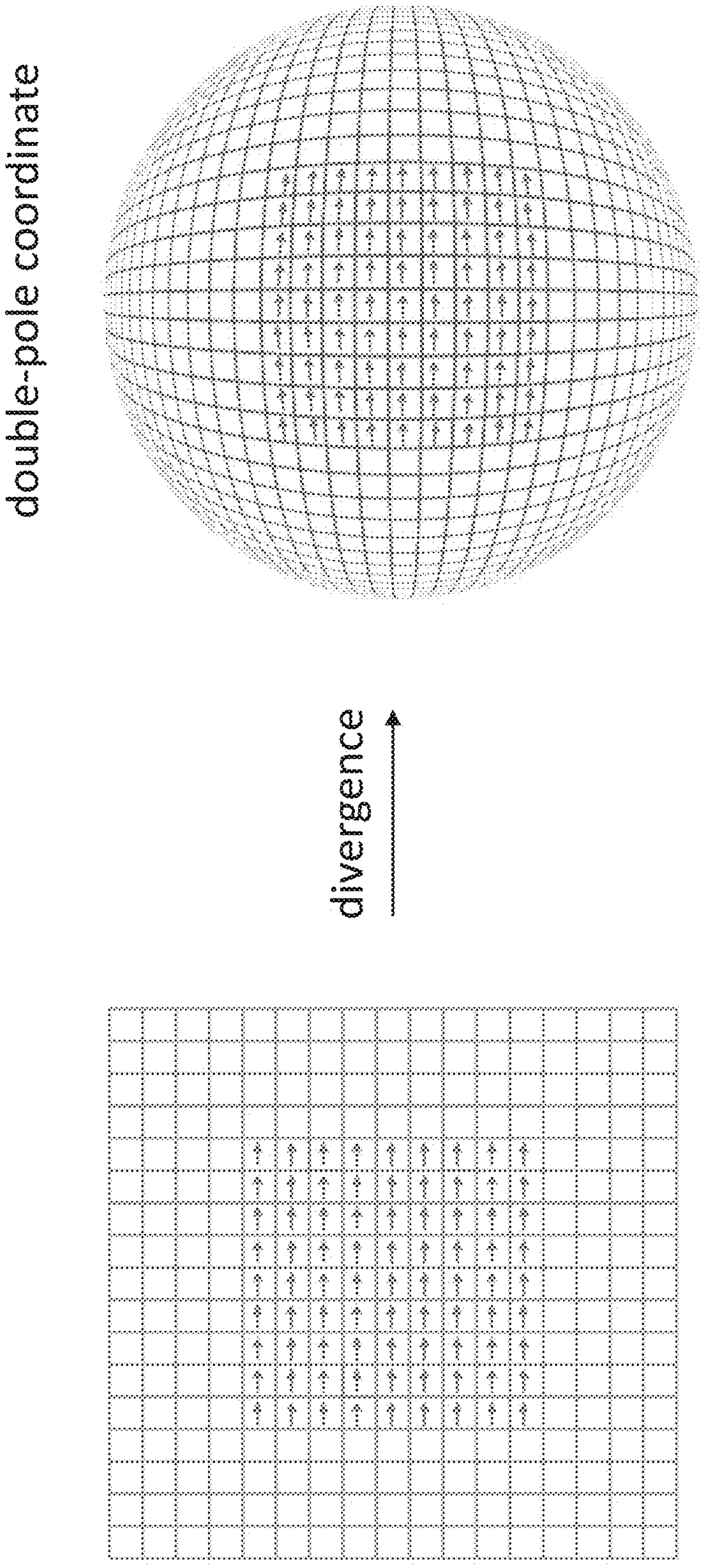
FIG. 2B is an illustration of change in axis of polarization state at plane.

Light sources such as a vertical-cavity surface-emitting laser (VCSEL) or a LED light source may include a divergent light source moving further away from the aperture and thus create a spherical wavefront. An array of VCSEL light sources may be utilized to create a VCSEL array. FIG. 2A illustrates an example output from a VCSEL light source. As illustrated, a spherical wavefront is incident on the metasurface. FIG. 2B is an illustration of change in axis of polarization state at plane. Due to the local curvature, spherical wavefronts may have a polarization axis which follows the grid curvature of a “double-pole” coordination system. The “double-pole” coordinate system is the grid rendered on a sphere in which two poles of the spherical coordinate system to the southernmost point of the sphere. FIG. 2B essentially shows the double-pole coordinate system. The arrows are aligned in the middle and slightly tilted along the curved portions conforming to the curved grid on the sphere.

Figure 2C:
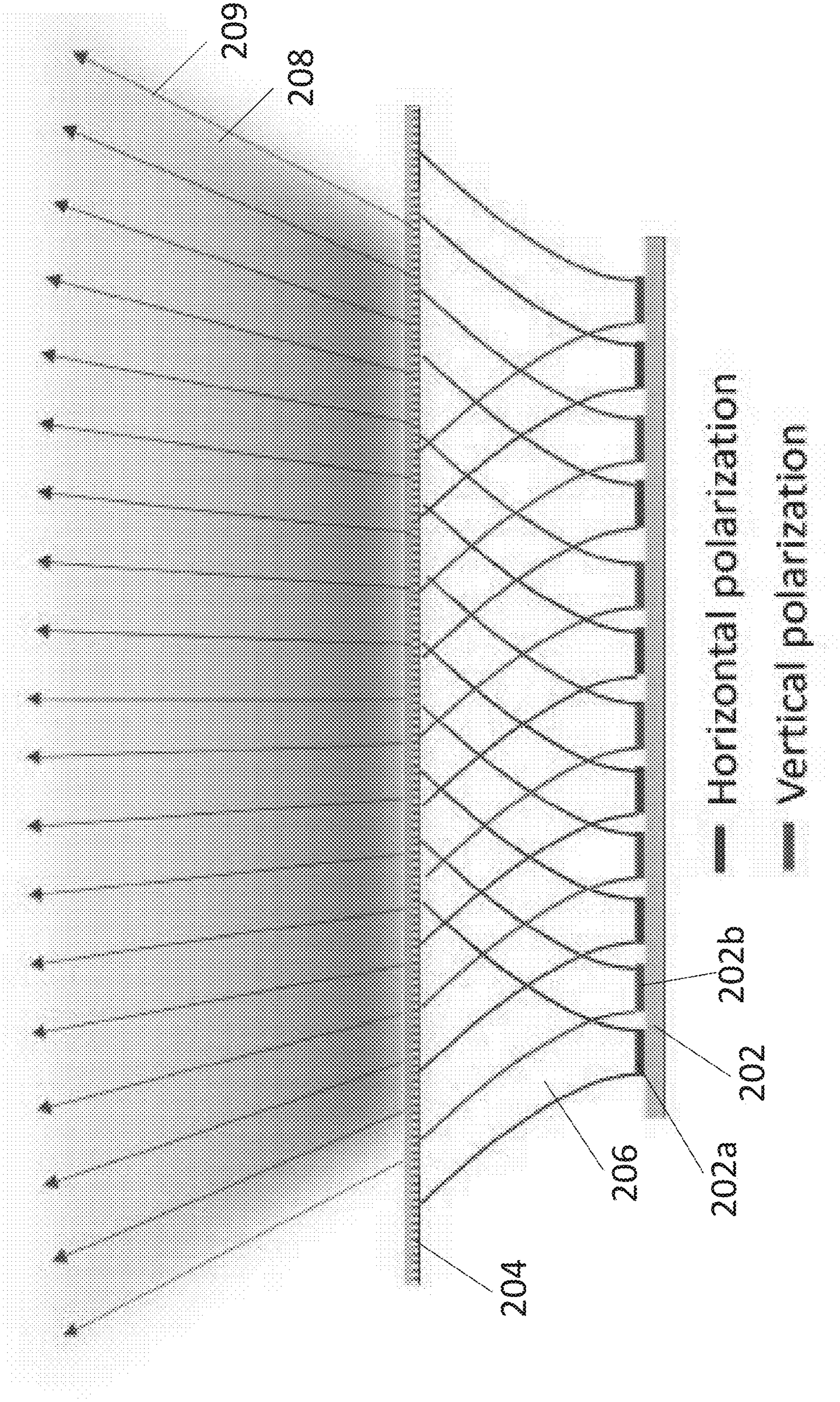
FIG. 2C is an example polarization-switchable illumination device.

Relative to a flat plane, the spherical wavefront may cause a skew of the axes at points on the plane far from the origin, particularly along the curved portions. FIG. 2C is an example polarization-switchable illumination device. The illumination device includes a VCSEL array 202 which includes interlaced vertical polarization VCSELs 202*a* and horizontal polarization VCSELs 202*b*. These VCSELs 202*a*, 202*b* output light 206 including two orthogonal polarizations with a spherical wavefront which is incident on a metasurface 204. The metasurface produces two distinct output light beams, a first light beam 208 and a second light beam 209, at separate times. The first light beam 208 may be produced by activating the vertical polarization VCSELs 202*a* and the second light beam 209 may be produced by activating the horizontal polarization VCSELs 202*b*. The first light beam 208 corresponds to the vertical polarization channel and the second light beam 209 corresponds to the horizontal channel. Each polarization channel can be switched by selective addressing of odd and even VCSEL columns. In some embodiments, the orthogonal polarizations may be two orthogonal linear polarizations. In some embodiments, the orthogonal polarizations may be circular polarizations and/or elliptical polarizations with opposite orientations. In some embodiments, the first light beam 208 and the second light beam 209 may be utilized sequentially. In some embodiments, the first light beam 208 and the second light beam 209 may be utilized simultaneously.

Figure 3:
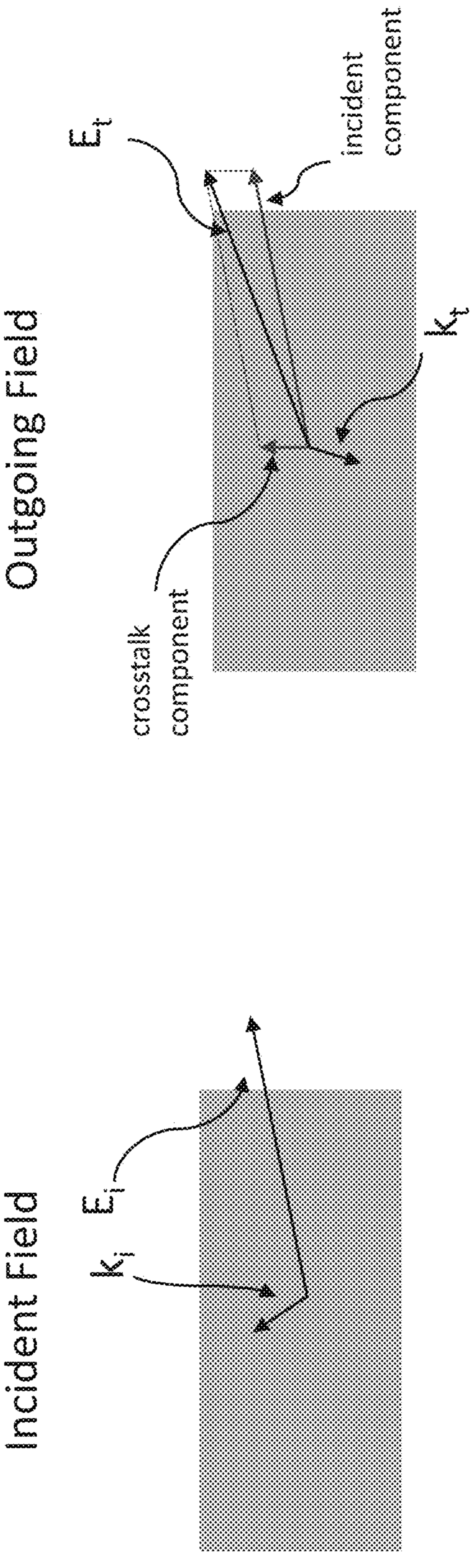
FIG. 3 illustrates the deleterious impact of not taking into consideration local polarization axis.

FIG. 3 illustrates the deleterious impact of not taking into consideration local polarization axis. During design, the metasurface unit cell may be chosen according to the phase shift it induces for the two orthogonal polarization linear states. If those two orthogonal linear polarization states do not take into account the spherical wavefront, then the designed element may induce a cross-polarization effect, as it mixes the incident, non-aligned polarization. When rays approach the metasurface unit at an oblique angle, the polarization may not be perfectly aligned with the width or length of the pillar which may create the above discussed crosstalk. Mixing of the input non-aligned polarization state with the output polarization may create the crosstalk. The output polarization may not be conserved in the presence of the crosstalk.

Figure 4A:
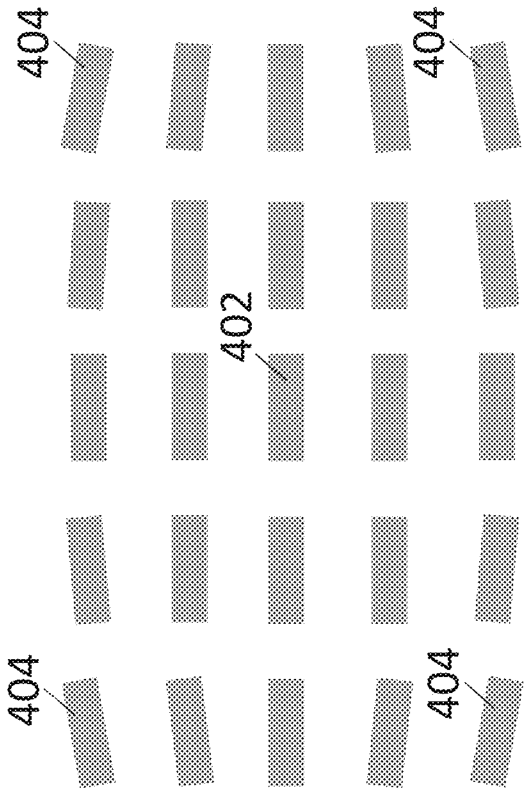
FIG. 4A illustrates an example metasurface device with alignment of the metasurface to local polarization axis in accordance with an embodiment of the invention.

FIG. 4A illustrates an example metasurface device with alignment of the metasurface to local polarization axis in accordance with an embodiment of the invention. Rotation of the metasurface units to change the orientation of the metasurface units can adjust the eigen polarization states to match at least one of the eigen polarization states to one of local polarization axes of the diverging beam. VCSEL array emitters that gives rise to a spherical wavefront or a divergent beam will benefit from this rotation of the metasurface units. Rotating metasurface units across the metasurface, the orientation and rotation angle may depend highly on the spherical wavefront of the VCSEL. There may be constant spacing between the metasurface elements across the metasurface device. Metasurface elements towards the center may be aligned to the nominal polarization directions, while those which are away from the origin (and in this configuration, along the curved portions), may be rotated with respect to the local coordinate frame for one of the polarizations. In the illustrated metasurface device, all rectangular cross-sections may be identical, but in other cases they may be different in shape (e.g., square, oval, crosses, etc.) or relative cross-sectional dimensions (i.e. length and width). The metasurface elements may include interior metasurface element(s) 402 which may be axis aligned and exterior metasurface elements 404 radiating outward which may be tilted more and more substantially as they are farther from the interior metasurface element(s) 402. Thus, metasurface elements on the fringes are more rotated.

Figure 4B:
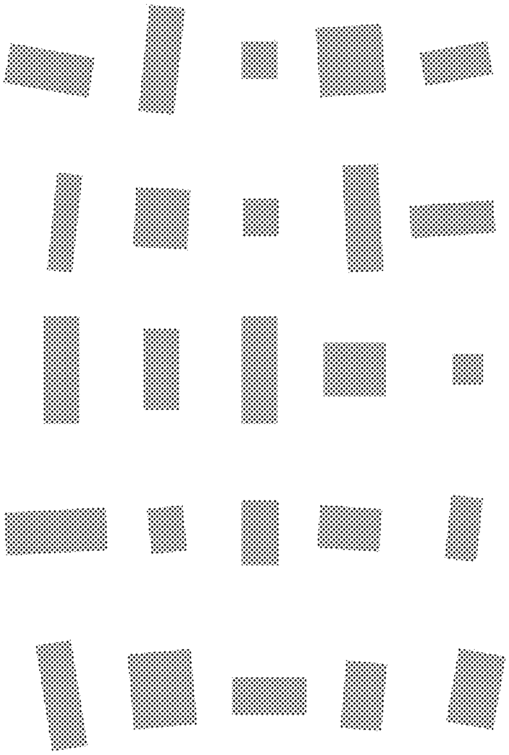
FIG. 4B illustrates alignment of metasurface to local polarization axis with a varied metasurface library including different rectangular cross-sections in accordance with an embodiment of the invention.

In some embodiments the rectangular cross-sections may be varied. With a library of rectangular cross-sections, the axes of the rectangles may follow one of the local axes. FIG. 4B illustrates alignment of metasurface to local polarization axis with a varied metasurface library including different rectangular cross-sections in accordance with an embodiment of the invention. As illustrated, the metasurface elements can change orientation and size (e.g. width and length) across the metasurface device in order to allow for spatial control over the phase as well as polarization tuning.

Figure 4C:
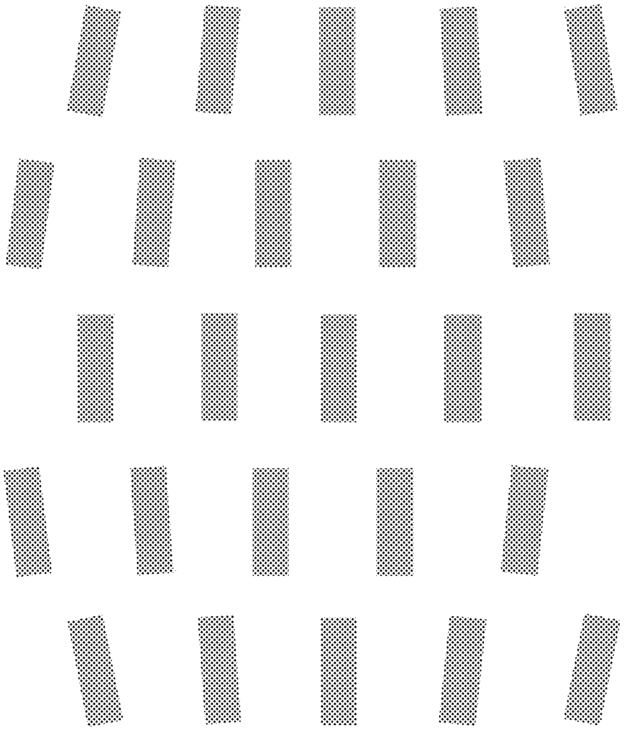
FIG. 4C illustrates an example metasurface device where the metasurface elements are arranged in a hexagonal grid in accordance with an embodiment of the invention.

In some embodiments, the metasurface device may be in rectangular or non-rectangular (e.g. hexagonal) grid. FIG. 4C illustrates an example metasurface device where the metasurface elements are arranged in a hexagonal grid in accordance with an embodiment of the invention.

Figure 4D:
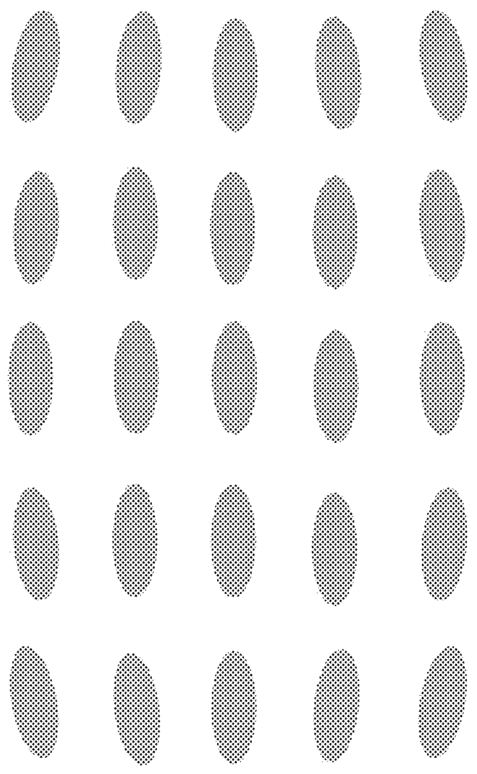
FIG. 4D illustrates an example metasurface device including metasurface elements including elliptical pillar cross-sectional shapes in accordance with an embodiment of the invention.

In some embodiments, the metasurface elements of the metasurface device may include different cross-sectional shapes. FIG. 4D illustrates an example metasurface device including metasurface elements including elliptical pillar cross-sectional shapes in accordance with an embodiment of the invention.

Figure 5:
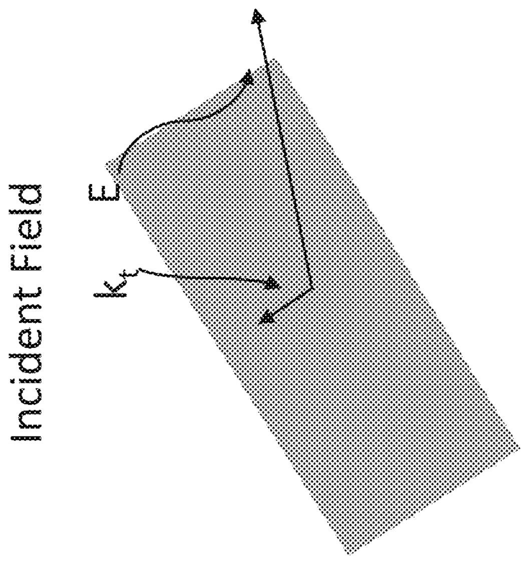
FIG. 5 illustrates an example metasurface unit cell aligned to a local polarization axis in accordance with an embodiment of the invention.

FIG. 5 illustrates an example metasurface unit cell aligned to a local polarization axis in accordance with an embodiment of the invention. During design, the metasurface unit cell dimension may be chosen based on the phase shift it induces and may be also aligned to the transverse component of propagation direction of the incident light. This choice makes the metasurface symmetric with respect to the incident light, and so the equivalent Jones matrix may be diagonal. Then, rotations of the incident polarization vector may be preserved. Shown is the transverse component of the wavevector, $k_t$ (e.g. the component of the wavevector k projected onto the xy-plane).

Figure 6:
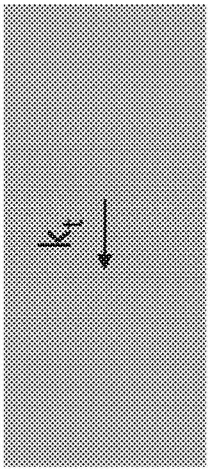
FIG. 6 illustrates an example metasurface unit cell with wavevector, kt labeled in accordance with an embodiment of the invention.

FIG. 6 illustrates an example metasurface unit cell with wavevector, $k_t$ labeled in accordance with an embodiment of the invention. The Jones matrices of unit cells may be considered. Jones matrices may be calculated for a unit cell at different angles of incidence (denoted by z-component of the wavevector, $k_z$). Only angles of incidence in the plane of the symmetry of the unit cell may be considered. For each $k_z$ of interest, the resulting Jones matrix may be calculated, which may be diagonal in the linear polarization basis because of the rectangular symmetry of the unit cell and incident field. U.S. Pat. App. Pub. No. 2022/0091428, entitled "Transmissive Metasurface Lens Integration" and filed Dec. 7, 2021, and U.S. Pat. App. Pub. No. 2021/0286188, entitled "Arbitrary polarization-switchable metasurfaces" and filed Feb. 22, 2019 discuss details about the Jones matrix of metasurface unit cells including metasurface elements. These references are incorporated by reference in their entirety for all purposes.

When used for design, the Jones matrix may then be diagonal and unitary, as illustrated, and a particular phase for the two polarizations may be targeted by utilizing $\varphi_1$ and $\varphi_2$ which are set by the dimensions of the unit cell:

$$\begin{bmatrix} e^{i\varphi_1} & 0 \\ 0 & e^{i\varphi_2} \end{bmatrix} \rightarrow \begin{bmatrix} e^{i\varphi_1(k_z)} & 0 \\ 0 & e^{i\varphi_2(k_z)} \end{bmatrix} \tag{1}$$

$\varphi_1$ and $\varphi_2$ are phase shifts on linearly polarized light along the fast axis and slow axis of the metasurface.

Figure 7:
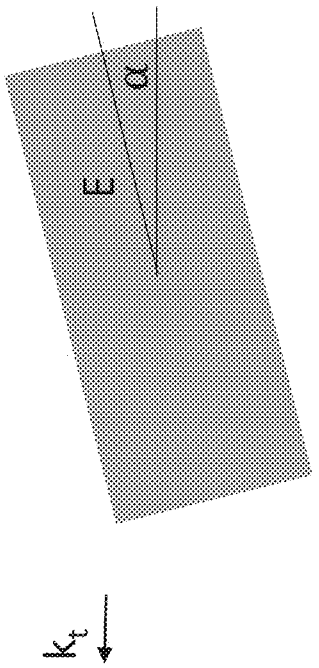
FIG. 7 is an example metasurface unit cell using Jones matrix calculus to derive alignment of the metasurface unit cell in accordance with an embodiment of the invention.

FIG. 7 is an example metasurface unit cell using Jones matrix calculus to derive alignment of the metasurface unit cell in accordance with an embodiment of the invention. For incident polarizations which are not aligned to the symmetry axis, the Jones matrix may be rotated (assuming the Jones matrix is equivalent under rotational symmetry, ignoring the lattice it is embedded in). Then, the outgoing polarization may be diagonal in the original basis, and then finally rotated back to the E-field's original frame. Viewed in this way, the outgoing linear polarization may be independently controlled by the unit cell design choice as given in $\varphi_1$ and $\varphi_2$, and the phase functions to be implemented in the metasurface can be independently specified.

$$J(\alpha; k_z) = R(\alpha)\begin{bmatrix} e^{i\varphi_1(k_z)} & 0 \\ 0 & e^{i\varphi_2(k_z)} \end{bmatrix} R(-\alpha) \tag{2}$$

$$J(\alpha; k_z)E(\alpha) = R(\alpha)\begin{bmatrix} e^{i\varphi_1(k_z)} & 0 \\ 0 & e^{i\varphi_2(k_z)} \end{bmatrix} R(-\alpha)R(\alpha)E_0 = R(\alpha)J(0, k_z)E_0 \tag{3}$$

where $R(\alpha)$ is the rotation matrix for rotation by an angle of $\alpha$. In these equations, the Jones matrix may be diagonal for the oblique k-vector.

The rotation $\alpha(x,y)$ of the metasurface elements at specific positions are defined by the following equation:

$$\alpha(x, y) = \arctan\left(\frac{-\sin(\phi_0(x, y))\cos(\phi_0(x, y))(1 - \cos(\theta_0(x, y)))}{\cos(\theta_0(x, y)) + \sin(\phi_0(x, y))^2(1 - \cos(\theta_0(x, y)))}\right) \tag{5}$$

$$\text{Where: } \phi_0(x, y) = \text{sgn}(y)\arccos\left(\frac{x}{\sqrt{x^2 + y^2}}\right) \tag{6}$$

-continued $$\theta_0(x, y) = \arccos\left(z_0 / \sqrt{x^2 + y^2 + z_0^2}\right) \tag{7}$$

in which $z_0$ is the distance of the metasurface plane from the source emitting with spherical wavefront placed at (x,y)=(0,0). The 'sgn' operator refers to the sign function which will be +1 for positive arguments and will be −1 for negative arguments.

The Jones matrix may depend on the structure of the unit cell based on the metasurface dimensions and the structure of the light source. $\varphi_1$ may be the phase response dictated by the metasurface dimensions. The Jones matrix may capture non-intuitive effects caused by coupling between adjacent elements and the lattice that the unit cells are embedded in.

Metasurface devices including rotated metasurface elements have been previously disclosed in connection with elliptical polarization states. For example, U.S. Pat. Pub. No. 2021/0286188, entitled "Arbitrary polarization-switchable metasurfaces" and filed Feb. 22, 2019, discloses metasurfaces including tilted metasurface elements which may be utilized for elliptical polarized light. However, previous rotated metasurface elements have not been connected with integration with light sources including a divergent spherical wavefront. The disclosed invention relates to rotated metasurface elements adapted for use with non-collimated light sources such as light sources with a spherical wavefront.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A metasurface device comprising:

a metasurface including multiple metasurface elements configured to receive light including at least one of a first polarization or a second polarization with a diverging wavefront from a light source, wherein the light source comprises a VCSEL array, wherein the VCSEL array comprises interlaced vertical polarization VCSELs and horizontal polarization VCSELs which output light with a spherical wavefront, wherein the first polarization and the second polarization are orthogonal, wherein the metasurface elements include an interior metasurface element which is substantially aligned to an axis and exterior metasurface elements which are rotated with respect to the axis, wherein the exterior metasurface elements positioned farther away from the interior metasurface element are more rotated than the exterior metasurface elements positioned closer to the interior metasurface element, and wherein the metasurface is configured to diffract light with the first polarization into a first output light beam and/or light with the second polarization into a second output light beam.

2. The metasurface device of claim 1, wherein the VCSEL array is configured to switch between light source is configured to output light from the vertical polarization VCSELs or the horizontal polarization VCSELs at distinctly different times.

3. The metasurface device of claim 2, wherein the first output light beam has a different illumination pattern than the second output light beam.

4. The metasurface device of claim 3, wherein the first output light beam has a more dispersed illumination pattern than the second output light beam.

5. The metasurface device of claim 1, wherein the VCSEL array comprises interlaced first polarization VCSELs and second polarization VCSELs, and wherein the first polarization VCSELs and second polarization VCSELs output light with opposite polarizations.

6. The metasurface device of claim 5, wherein the first polarization VCSELs and the second polarization VCSELs output circularly polarized light.

7. The metasurface device of claim 5, wherein the first polarization VCSELs and the second polarization VCSELs output elliptically polarized light.

8. The metasurface device of claim 1, wherein the light received by the metasurface has a non-collimated wavefront.

9. The metasurface device of claim 1, wherein the metasurface elements are rectangular with identical length and width.

10. The metasurface device of claim 1, wherein the metasurface elements are rectangular and at least one metasurface element has a different length and/or width than another metasurface element of the metasurface elements.

11. The metasurface device of claim 1, wherein the metasurface elements are elliptical.

12. The metasurface device of claim 1, wherein the metasurface elements are arranged in a rectangular grid.

13. The metasurface device of claim 1, wherein the metasurface elements are arranged in a hexagonal grid.

14. The metasurface device of claim 1, wherein the rotation, $\alpha(x,y)$, of the metasurface elements at specific positions are defined by the following equation:

$$\alpha(x, y) = \arctan\left(\frac{-\sin(\phi_0(x, y))\cos(\phi_0(x, y))(1 - \cos(\theta_0(x, y)))}{\cos(\theta_0(x, y)) + \sin(\phi_0(x, y))^2(1 - \cos(\theta_0(x, y)))}\right)$$

$$\text{where } \phi_0(x, y) = \text{sgn}(y)\left(\frac{x}{\sqrt{x^2 + y^2}}\right),$$

$$\text{where } \theta_0(x, y) = \arccos\left(z_0 / \sqrt{x^2 + y^2 + z_0^2}\right),$$

and where $z_0$ is the distance of the metasurface plane from the source emitting with spherical wavefront placed at (x,y)=(0,0).

15. A metasurface device comprising:

a metasurface including multiple metasurface elements configured to receive light including at least one of a first polarization or a second polarization with a diverging wavefront from a light source, wherein the light source comprises a VCSEL array, wherein the VCSEL array comprises interlaced first polarization VCSELs and second polarization VCSELs, and wherein the first polarization VCSELs and second polarization VCSELs output light with opposite polarizations;

wherein the first polarization and the second polarization are orthogonal, wherein the metasurface elements include an interior metasurface element which is substantially aligned to an axis and exterior metasurface elements which are rotated with respect to the axis, wherein the exterior metasurface elements positioned farther away from the interior metasurface element are more rotated than the exterior metasurface elements positioned closer to the interior metasurface element, and wherein the metasurface is configured to diffract light with the first polarization into a first output light beam and/or light with the second polarization into a second output light beam.

16. The metasurface device of claim 15, wherein the VCSEL array comprises interlaced vertical polarization VCSELs and horizontal polarization VCSELs which output light with a spherical wavefront.

17. The metasurface device of claim 16, wherein the VCSEL array is configured to switch between light source is configured to output light from the vertical polarization VCSELs or the horizontal polarization VCSELs at distinctly different times.

18. The metasurface device of claim 17, wherein the first output light beam has a different illumination pattern than the second output light beam.

19. The metasurface device of claim 18, wherein the first output light beam has a more dispersed illumination pattern than the second output light beam.

20. The metasurface device of claim 15, wherein the first polarization VCSELs and the second polarization VCSELs output circularly polarized light.

21. The metasurface device of claim 15, wherein the first polarization VCSELs and the second polarization VCSELs output elliptically polarized light.

22. The metasurface device of claim 15, wherein the light received by the metasurface has a non-collimated wavefront.

23. The metasurface device of claim 15, wherein the metasurface elements are rectangular with identical length and width.

24. The metasurface device of claim 15, wherein the metasurface elements are rectangular and at least one metasurface element has a different length and/or width than another metasurface element of the metasurface elements.

25. The metasurface device of claim 15, wherein the metasurface elements are elliptical.

26. The metasurface device of claim 15, wherein the metasurface elements are arranged in a rectangular grid.

27. The metasurface device of claim 15, wherein the metasurface elements are arranged in a hexagonal grid.

28. The metasurface device of claim 15, wherein the rotation, α(x,y), of the metasurface elements at specific positions are defined by the following equation:

$$\alpha(x, y) = \arctan\left(\frac{-\sin(\phi_0(x, y))\cos(\phi_0(x, y))(1 - \cos(\theta_0(x, y)))}{\cos(\theta_0(x, y)) + \sin(\phi_0(x, y))^2(1 - \cos(\theta_0(x, y)))}\right)$$

$$\text{where } \phi_0(x, y) = \operatorname{sgn}(y)\left(\frac{x}{\sqrt{x^2 + y^2}}\right),$$

$$\text{where } \theta_0(x, y) = \arccos\left(z_0/\sqrt{x^2 + y^2 + z_0^2}\right),$$

and where $z_0$ is the distance of the metasurface plane from the source emitting with spherical wavefront placed at (x,y)=(0,0).

29. A metasurface device comprising:

a metasurface including multiple metasurface elements configured to receive light including at least one of a first polarization or a second polarization with a diverging wavefront from a light source, wherein the first polarization and the second polarization are orthogonal, wherein the metasurface elements include an interior metasurface element which is substantially aligned to an axis and exterior metasurface elements which are rotated with respect to the axis, wherein the exterior metasurface elements positioned farther away from the interior metasurface element are more rotated than the exterior metasurface elements positioned closer to the interior metasurface element, and wherein the metasurface is configured to diffract light with the first polarization into a first output light beam and/or light with the second polarization into a second output light beam; wherein the rotation, α(x,y), of the metasurface elements at specific positions are defined by the following equation:

$$\alpha(x, y) = \arctan\left(\frac{-\sin(\phi_0(x, y))\cos(\phi_0(x, y))(1 - \cos(\theta_0(x, y)))}{\cos(\theta_0(x, y)) + \sin(\phi_0(x, y))^2(1 - \cos(\theta_0(x, y)))}\right)$$

$$\text{where } \phi_0(x, y) = \operatorname{sgn}(y)\left(\frac{x}{\sqrt{x^2 + y^2}}\right),$$

$$\text{where } \theta_0(x, y) = \arccos\left(z_0/\sqrt{x^2 + y^2 + z_0^2}\right),$$

and where $z_0$ is the distance of the metasurface plane from the source emitting with spherical wavefront placed at (x,y)=(0,0).

30. The metasurface device of claim 29, wherein the light source comprises a VCSEL array.

31. The metasurface device of claim 30, wherein the VCSEL array comprises interlaced vertical polarization VCSELs and horizontal polarization VCSELs which output light with a spherical wavefront.

32. The metasurface device of claim 31, wherein the VCSEL array is configured to switch between light source is configured to output light from the vertical polarization VCSELs or the horizontal polarization VCSELs at distinctly different times.

33. The metasurface device of claim 32, wherein the first output light beam has a different illumination pattern than the second output light beam.

34. The metasurface device of claim 33, wherein the first output light beam has a more dispersed illumination pattern than the second output light beam.

35. The metasurface device of claim 30, wherein the VCSEL array comprises interlaced first polarization VCSELs and second polarization VCSELs, and wherein the first polarization VCSELs and second polarization VCSELs output light with opposite polarizations.

36. The metasurface device of claim 35, wherein the first polarization VCSELs and the second polarization VCSELs output circularly polarized light.

37. The metasurface device of claim 35, wherein the first polarization VCSELs and the second polarization VCSELs output elliptically polarized light.

38. The metasurface device of claim 29, wherein the light received by the metasurface has a non-collimated wavefront.

39. The metasurface device of claim 29, wherein the metasurface elements are rectangular with identical length and width.

40. The metasurface device of claim 29, wherein the metasurface elements are rectangular and at least one metasurface element has a different length and/or width than another metasurface element of the metasurface elements.

41. The metasurface device of claim 29, wherein the metasurface elements are elliptical.

42. The metasurface device of claim 29, wherein the metasurface elements are arranged in a rectangular grid.

43. The metasurface device of claim 29, wherein the metasurface elements are arranged in a hexagonal grid.

* * * * *